(12) United States Patent
Nakano et al.

(10) Patent No.: US 10,473,906 B2
(45) Date of Patent: Nov. 12, 2019

(54) MICROSCOPE

(71) Applicant: NIKON CORPORATION, Tokyo (JP)

(72) Inventors: Yoshitaro Nakano, Tokyo (JP);
Takaaki Okamoto, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 15/314,762

(22) PCT Filed: May 30, 2014

(86) PCT No.: PCT/JP2014/064424
§ 371 (c)(1),
(2) Date: Mar. 27, 2017

(87) PCT Pub. No.: WO2015/181951
PCT Pub. Date: Dec. 3, 2015

(65) Prior Publication Data
US 2017/0205614 A1    Jul. 20, 2017

(51) Int. Cl.
*G02B 21/24* (2006.01)
*G02B 7/28* (2006.01)
(Continued)

(52) U.S. Cl.
CPC .............. *G02B 21/245* (2013.01); *G02B 7/28* (2013.01); *G02B 7/36* (2013.01); *G02B 21/26* (2013.01); *G02B 21/36* (2013.01)

(58) Field of Classification Search
CPC ...... G02B 21/245; G02B 21/26; G02B 21/36; G02B 7/28
(Continued)

(56) References Cited

U.S. PATENT DOCUMENTS 4,958,920 A    9/1990  Jorgens et al.
5,352,882 A *  10/1994 Koyanagi ................ G02B 7/10
                                                250/201.7
(Continued)

FOREIGN PATENT DOCUMENTS

EP    1760455 A1    3/2007
JP    H02-118609 A  5/1990
(Continued)

OTHER PUBLICATIONS

Sep. 2, 2014 Search Report issued in International Patent Application No. PCT/JP2014/064424.
(Continued)

*Primary Examiner* — Seung C Sohn
(74) *Attorney, Agent, or Firm* — Oliff PLC

(57) ABSTRACT

A microscope device includes an interface detector that detects the position of an interface present in a container containing an observation object and a controller that performs focus maintenance control for maintaining the focal position of an objective lens in a reference position distant from the interface detected by the interface detector in the direction of the optical path of the objective lens by a predetermined distance (an offset value) and, in a time period when an image capture unit is capturing images, changes the focal position from the reference position by moving at least one of the objective lens and observation object in the direction of the optical path with reference to the reference position.

10 Claims, 12 Drawing Sheets

(51) Int. Cl.
*G02B 7/36* (2006.01)
*G02B 21/26* (2006.01)
*G02B 21/36* (2006.01)

(58) Field of Classification Search
USPC .................................................. 250/201.3
See application file for complete search history.

(56) References Cited

U.S. PATENT DOCUMENTS

| | | | |
|---|---|---|---|
| 5,450,204 A | | 9/1995 | Shigeyama et al. |
| 6,071,748 A * | | 6/2000 | Modlin ................ B01L 9/523 250/459.1 |
| 6,353,216 B1 * | | 3/2002 | Oren ................... G02B 21/006 250/201.3 |
| 6,441,894 B1 * | | 8/2002 | Manian ............... G01N 21/6452 356/123 |
| 7,071,451 B2 * | | 7/2006 | Ishikawa ............. G02B 21/245 250/201.3 |
| 7,469,056 B2 | | 12/2008 | Ramm et al. |
| 8,563,912 B2 * | | 10/2013 | Mitzkus ............... G02B 21/241 250/201.3 |
| 8,710,412 B2 * | | 4/2014 | Kishima .............. G02B 21/245 250/201.3 |
| 9,671,601 B2 * | | 6/2017 | Krueger ............... G02B 21/242 |
| 2004/0113043 A1 | | 6/2004 | Ishikawa et al. |
| 2005/0068614 A1 | | 3/2005 | Yoneyama et al. |
| 2006/0001954 A1 | | 1/2006 | Wahl et al. |
| 2007/0103687 A1 | | 5/2007 | Okazaki |
| 2007/0122143 A1 | | 5/2007 | Okamoto |
| 2008/0111911 A1 | | 5/2008 | Kawanabe |
| 2013/0342902 A1 | | 12/2013 | Krueger et al. |

FOREIGN PATENT DOCUMENTS

| | | |
|---|---|---|
| JP | 2001-091821 A | 4/2001 |
| JP | 2004-070276 A | 3/2004 |
| JP | 2005-128493 A | 5/2005 |
| JP | 2007-148161 A | 6/2007 |
| JP | 2007-148221 A | 6/2007 |
| JP | 2008-122857 A | 5/2008 |
| JP | 2010-026241 A | 2/2010 |
| JP | 4847690 B2 | 12/2011 |
| JP | 2012-173373 A | 9/2012 |
| JP | 2013-020172 A | 1/2013 |
| WO | 2005/124321 A1 | 12/2005 |

OTHER PUBLICATIONS

Dec. 6, 2016 Preliminary Report on Patentability issued in International Patent Application No. PCT/JP2014/064424.
Nov. 28, 2017 Office Action issued in Japanese Patent Application No. 2016-523057.
Feb. 21, 2018 Search Report issued in European Patent Application No. 14893365.8.
Sep. 4, 2018 Office Action issued in Japanese Patent Application No. 2016-523057.
Jun. 18, 2019 Office Action issued in Japanese Patent Application No. 2016-523057.
Jun. 18, 2019 Decision of Dismissal of Amendment issued in Japanese Patent Application No. 2016-523057.

* cited by examiner (a-1)     (a-2)     (a-3)

(b-1)     (b-2)     (b-3)

MICROSCOPE

TECHNICAL FIELD

The present invention relates to a focus adjustment device, microscope device, focus adjustment method, and control program.

BACKGROUND ART

As methods for adjusting the focus of an optical microscope when observing the inside of an observation sample, the following methods are known. In a method described in Patent Literature 1, a system detects the interface of a sample (e.g., the lower surface of a container) and focuses on the detected interface. The system shifts the focal position to the inside of the sample by moving an objective lens in a Z-direction (in the direction of the optical axis of the objective lens) by a predetermined amount (a fixed distance) with respect the interface. The system then acquires many images at predetermined intervals in the Z-direction inside the sample and determines the most appropriate focal position on the basis of the acquired many images.

In a Method described in Patent Literature 2, a system detects the interface of a sample (e slide glass or cover glass) and focuses on the detected interface. The system then moves at least one of a stage and an objective lens in the Z-direction by a predetermined amount. The system then captures images of the sample at predetermined measurement time intervals while moving at least one of the stage and objective lens in the Z-direction (to the inside of the sample). In this way, time lapse observation is performed using the method described in Patent Literature 2.

CITATION LIST

Patent Literature

[Patent Literature 1] U.S. Pat. No. 7,469,056
[Patent Literature 2] Japanese Patent No. 4847690

SUMMARY OF INVENTION

Technical Problem

However, in the methods described in Patent Literatures 1, 2, the system must operate in two stages, that is, it must focus on the position of the interface of the sample (e.g., the lower surface of the container) and then move the focal position from the position of the interface to the inside of the sample by the predetermined amount. Accordingly, the methods described in Patent Literatures 1, 2, have difficulty in adjusting the focal position in a short time.

An object of an aspect of the present invention is to adjust the focal position in a shorter time when observing the inside of an observation sample.

Solution To Problem

An first aspect of the present invention provides focus adjustment device including an interface detector that detects a position of an interface present in a container containing an observation object and a controller that performs focus maintenance control for maintaining a focal position of an objective lens in a reference position distant from the interface detected by the interface detector in a direction of an optical axis of the objective lens by a predetermined distance and, in a time period when an image capture unit is capturing an image, changes the focal position from the reference position by moving at least one of the objective lens and the observation object in the direction of the optical axis with reference to the reference position.

A second aspect of the present invention provides a microscope device including the focus adjustment device.

A third aspect of the present invention provides a focus adjustment method for focusing on an observation object. The method includes detecting a position of an interface present in a container containing the observation object; and performing focus maintenance control for maintaining a focal position of an objective lens in a reference position distant from the interface detected by the interface detector in a direction of an optical axis of the objective lens by a predetermined distance and, in a time period when an image capture unit is capturing an image, changing the focal position from the reference position by moving at least one of the objective lens and the observation object in the direction of the optical axis with reference to the reference position.

An fourth aspect of the present invention provides a control program for causing a computer to perform a detection process of causing an interface detector to detect a position of an interface present in a container containing an observation object and a control process of performing focus maintenance control for maintaining a focal position of an objective lens in a reference position distant from the interface detected by the interface detector in a direction of an optical axis of the objective lens by a predetermined distance and, in a time period when an image capture unit is capturing an image, changing the focal position from the reference position by moving at least one of the objective lens and the observation object in the direction of the optical axis with reference to the reference position.

Advantageous Effects of Invention

According to the aspect of the present invention, the focal position can be adjusted in a short time.

BRIEF DESCRIPTION OF THE DRAWINGS

FIG. 3(*b*) is a diagram showing a state in which the offset lens has been moved; and FIG. 3(*c*) is a diagram showing a state in which the focal position has been adjusted.

FIG. 4(*b*) is a diagram showing a case in which both focus maintenance control and image AF control are performed.

DETAILED DESCRIPTION

Now, embodiments of the present invention will be described with reference to the drawings. However, the present invention is not limited thereto. To clarify the embodiments, the drawings may be scaled as appropriate, for example, partially enlarged or highlighted.

<First Embodiment>

Figure 1:
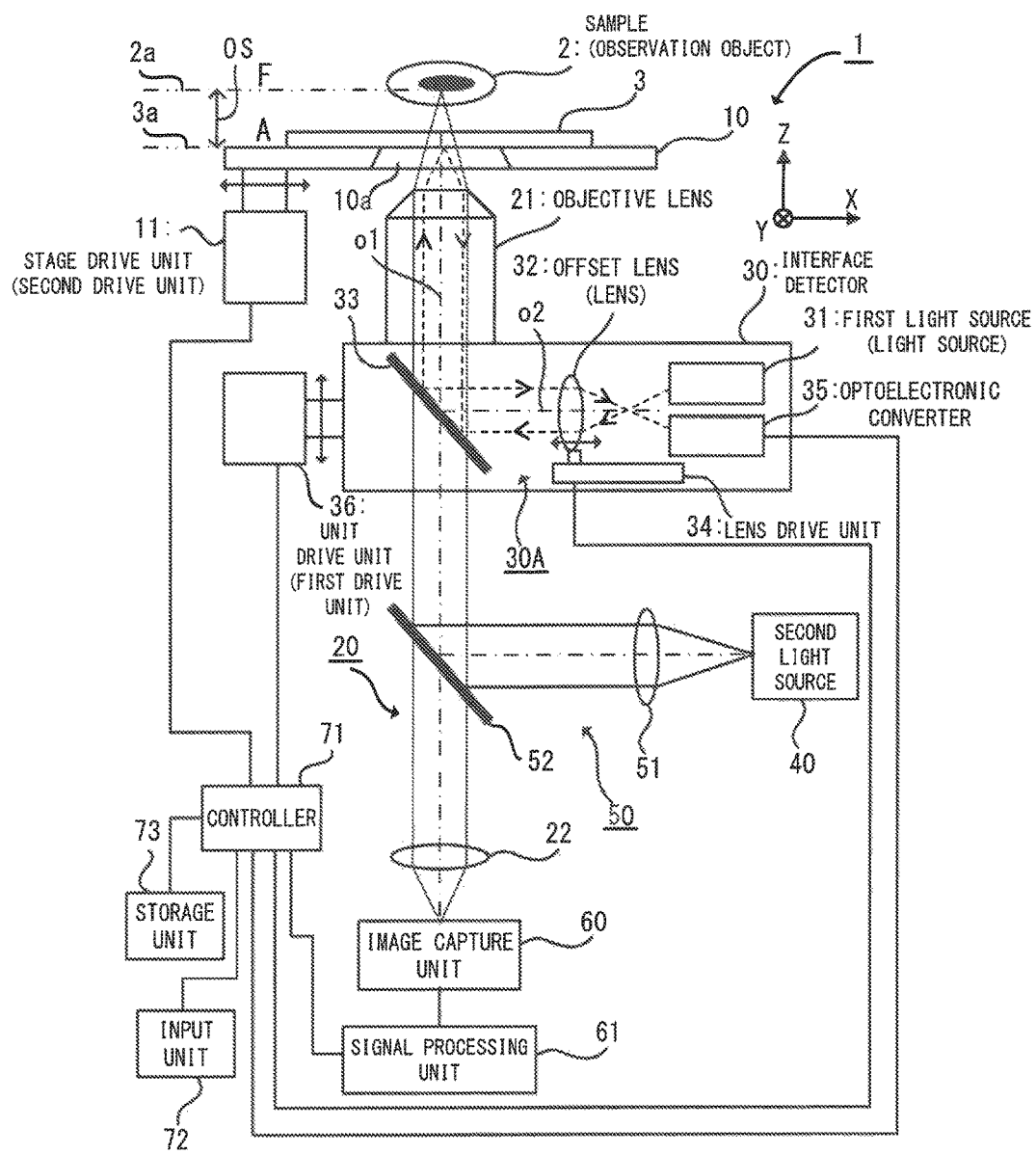
FIG. 1 is a diagram showing the configuration of a microscope device including a focus adjustment device of a first embodiment.

FIG. 1 is a diagram showing the configuration of a microscope device 1 including a focus adjustment device of a first embodiment. The directions in FIG. 1 will be described using an XYZ coordinate system. In this XYZ coordinate system, a plane parallel with the horizontal plane is defined as an XY plane. The right direction of FIG. 1 in the XY-plane is referred to as an X-direction; the direction perpendicular to the X-direction in the XY-plane (the direction directed from the front to the back of FIG. 1) as a Y-direction; and the direction perpendicular to the XY-plane (the vertical direction) as a Z-direction.

The microscope device 1 of the first embodiment shown in FIG. 1 includes an optical microscope that is used to observe samples 2 (also referred to as observation objects or specimens) and generates enlarged images of the samples 2 and a control device that controls the operation of the optical microscope. The optical microscope includes an XY stage 10, an image-forming optical system 20, an interface detector 30, a second light source 40, an illumination optical system 50, an image capture unit 60, a signal processing unit 61, and drive units 11, 34, and 36. This optical microscope is an inverted microscope in which an objective lens 21 is disposed below each sample 2 so that the sample 2 is observed from below. The control device includes a controller 71, an input unit 72, and a storage unit 73. The image-forming optical system 20 forms an optical path between the objective lens 21 and image capture unit 60. The image-forming optical system 20 shares the optical path from a dichroic mirror 52 to the objective lens 21 with the illumination optical system 50, which forms the optical path from the second light source 40 to the objective lens 21.

A microplate (a sample container) 3 containing the sample 2 is placed on the XY stage 10. The microplate 3 formed of transparent plastic. The microplate 3 includes many sample holding sections (hereafter referred to as wells), and a sample 2 is held in each well. The samples 2 are, for example, fluorescent-stained HeLa cells. The user (observer, operator) holds HeLa cells in solutions (medium) having various concentrations in the wells. The nucleus of each HeLa cell is stained with Hoechst 33452, and the actin filament thereof is stained with Alexa Fluor 488 Phalloidin. Note that in FIG. 1, the samples 2 are not floating over the microplate 3 but are placed on the microplate 3. In the present embodiment, it is assumed that the user wants to observe the central portion of each sample 2 (e.g., the nucleus of a cell). A surface of this portion in the Z-direction is referred to as a sample surface 2a (or specimen surface).

The XY stage 10 has an opening 10a that corresponds to the positions of the wells in the microplate 3 and guides light coming from below (from the objective lens 21 side), that is, light traveling in the Z-direction to the samples 2. When driven by the stage drive unit 11, the XY stage 10 moves in the X- and Y-directions. Thus, a well whose image is to be captured is moved to a position facing the objective lens 21. The stage drive unit (a second drive unit) 11 moves the XY stage 10 in the X- and Y-directions on the basis of a control signal from the controller 71.

The image-forming optical system 20 includes the objective lens 21 and an image-forming lens 22. The objective lens 21 is disposed below the XY stage 10. The parfocal distance of the objective lens 21 is the distance from the mounting plane (the mounting reference plane or flange plane) of the objective lens 21 to the plane of the focal position of the objective lens 21 (the focal plane of the objective lens 21) That is, the parfocal distance is the distance from the mounting plane of the objective lens 21 to the sample surface 2a when the sample surface 2a focus. Typically, the objective lens 21 is designed in such a manner that the parfocal distance thereof is a predetermined distance. The objective lens 21 and image-forming lens 22 are disposed on the same optical path. The optical axis of the objective lens 21 and image-forming lens 22 is referred to as a first optical path O1. In the present embodiment, the direction of the first optical path O1 is the Z-direction. In the following description, the focal position of the objective lens 21 in the Z-direction is referred to as a focal position F. In an example shown in FIG. 1, the focal position F matches the position of the sample surface 2a.

In the present embodiment, the interface detector 30 detects, as the interface, the position of the lower surface 3a of the bottom of the microplate holding the samples 2. However, the "interface" is not limited thereto. For example, if an observation is performed using an immersion objective, the bottom of the container containing the specimens, which is a surface at which the container and specimens are in contact with each other, may be used as the interface. If an observation is performed using a dry objective, the surface of the container in contact with the stage of the microscope having the container placed thereon may be used as the interface. If a cultivation container capable of containing observation samples in a sealed space is used and the observation samples are stuck to (suspended from) the upper surface of the container, the upper surface of the container may be used as the interface. As shown in FIG. 1, the interface detector 3, includes a first light source (a light source) 31, a focusing optical system 30A including an offset lens (a lens) 32 and a dichroic mirror 33, a lens drive unit 34, and an optoelectronic converter 35. Dotted lines in the interface detector 30 and objective lens 21 shown in FIG. 1 indicate the path of light emitted from the first light source 31 and the path of light reflected from the lower surface 3a of the bottom of the microplate 3. Arrows on each optical path indicate the traveling directions of the light. The focusing optical system 30A forms the optical path between the interface detector 30 and objective lens 21. It shares the optical path from the dichroic mirror 33 to the objective lens 21 with the image-forming optical system 20 and illumination optical system 50.

The first light source 31 is, for example, an infrared light-emitting diode (LED) that emits infrared light (or near infrared light). The focusing optical system 30A guides infrared light emitted by the first light source 31 to the objective lens 21. The offset lens 32 included in the focusing optical system 30A is configured to be capable of moving in the direction of a second optical axis O2 and changes an offset value OS (to be discussed later) by moving in the direction of the second optical axis O2. As will be discussed later, the offset lens 32 includes, for example, a convex lens 32a and a concave lens 32b (see FIG. 3).

The dichroic mirror 33 included in the focusing optical system 30A reflects light with a particular wavelength (infrared light in the present embodiment) and transmits light with other wavelengths (visible light and fluorescence). The dichroic mirror 33 is disposed on the image side of the objective lens 21 on the optical path formed by the image-forming optical system 20. The dichroic mirror 33 reflects infrared light emitted from the first light source 31 and passed through the offset lens 32 to guide the infrared light to the objective lens 21. The dichroic mirror 33 also reflects the reflected light (infrared light) reflected from the lower surface 3a of the bottom of the microplate 3 and passed through the objective lens 21 to guide the reflected light to the offset lens 32. The lens drive unit 34 moves the offset lens 32 in the direction of the second optical axis O2 on the basis of a control signal from the controller 71. The optoelectronic converter 35 is disposed in the position in which the focusing optical system 30A forms an image of the reflected light. The optoelectronic converter 35 is, for example, a line charge-coupled device (CCD) sensor that receives reflected light (infrared light) from the lower surface 3a of the bottom of the microplate 3 and converts the received light into an electrical signal.

Described below is a process until infrared light emitted from the first light source 31 is received by the optoelectronic converter Infrared light emitted from the first light source 31 is subjected to curvature change by the offset lens 32 and then reflected in the Z-direction by the dichroic mirror 33 disposed on the image side of the objective lens 21 and thus guided to the objective lens 21. The objective lens 21 collects the infrared light and applies it to the bottom of the microplate 3. The Z-direction position of a light image based on the infrared light formed by the objective lens 21 is referred to as an image-formed position A. In the example shown in FIG. 1, the mage-formed position A matches the position of the lower surface 3a of the bottom of the microplate 3. The infrared light emitted from the objective lens 21 is reflected by the lower surface 3a of the bottom of the microplate 3. In the following description, the lower surface 3a will be referred to as the reflection surface. Also, the reflection surface 3a may be referred to as the interface or boundary surface.

The reflected light (infrared light) reflected by the reflection surface 3a is passed through the objective lens 21 again and then reflected by the dichroic mirror 33 and thus guided to the offset lens 32. The reflected light is then passed through the offset lens 32, and an image thereof is formed on the light receiving surface of the optoelectronic converter 35. The optoelectronic converter 35 converts the received light into an electrical signal and outputs detection signal corresponding the electrical signal to the controller 71.

In the example shown in FIG. 1, the objective lens 21 and interface detector 30 are combined together. The unit drive unit (a first drive unit) 36 moves the objective lens and interface detector 30 in the -direction (i.e., vertically moves these elements) on the basis of a control signal from the controller 71. Although not shown in FIG. 1, a revolver for switching between multiple objective lenses is disposed at the junction of the objective lens 21 and interface detector 30. However, the positional relationship among the objective lens 21, revolver, and interface detector 30 is not limited thereto. The first light source 31, offset lens 32, optoelectronic converter 35, and lens drive unit 34 may be spaced from the revolver. In this case, an optical tem for guiding light from the first light source 31 to the dichroic mirror 33 needs to be disposed. However, the use of such disposition allows, for example, the revolver holding the objective lens 21 to be moved in the Z-direction for focus adjustment without the speed of the vertical movement thereof being affected by the first light source 31, optoelectric converter, offset lens 32, and lens drive unit 34.

The second light source 40 is, for example, an LED that emits excitation illumination light to perform a fluorescent observation of the samples 2. The illumination optical system 50 includes a collimator lens 51 and a dichroic mirror 52. The collimator lens 51 converts illumination light emitted from the second light source 40 into parallel rays or approximately parallel rays. The dichroic mirror 52 reflects illumination light and transmits fluorescence. The dichroic mirror 52 is disposed on the optical path formed by the image-forming optical system 20. The dichroic mirror 52 reflects part of the illumination light (some of the parallel rays or approximately parallel rays) passed through the collimator lens 51 to guide it to the objective lens 21. The dichroic mirror 52 also transmits signal light (e.g., fluorescence excited by the illumination light) from each sample 2 to guide it to the image-forming lens 22. Solid lines in the image-forming optical system 20 and illumination optical system 50 shown in FIG. 1 indicate the path of the light emitted from the second light source 40.

Described below is a process until illumination light emitted from the second light source 40 is received by the image capture unit 60. Illumination light emitted from the second light source 40 is converted into parallel rays or approximately parallel rays by the collimator lens 51. The illumination light that has been converted into parallel rays or approximately parallel rays by the collimator lens 51 is reflected by the dichroic mirror 52 in the Z-direction. The fluorescence reflected by the dichroic mirror 52 is passed through the dichroic mirror 33 and guided to the objective lens 21. The objective lens 21 collects the illumination light and applies it to each sample 2 in the microplate 3. As described above, in FIG. 1, the focal position F of the objective lens 21 is the position of the sample surface 2a.

The signal light from each sample 2 is passed through the objective lens 21 again and then passed through the dichroic mirror 33. Part of the signal light passed through the dichroic mirror 33 is passed through the dichroic mirror 52 and guided to the image-forming lens 22. The image-forming lens 22 forms an image of the signal light on the light receiving surface (the image capture surface) of the image capture unit 60.

The image capture unit 60 acquires the formed image as an image of a sample 2 on the XY stage 10. The image capture unit 60 is, for example, a CCD sensor that converts received signal light into an electrical signal (a pixel-specific image signal). The image capture unit 60 then outputs the electrical signal to the signal processing unit 61. The signal processing unit 61 performs signal processing on the electrical signal outputted from the image capture unit 60 to generate a contrast signal indicating the contrast (the contrast evaluation value) of the image of the sample 2. The image processing unit 61 then outputs the generated contrast signal to the controller 71. The signal processing unit 61 also performs signal processing on the electrical signal outputted from the image capture unit 60 to generate image data. The image processing unit 61 then outputs the generated image data to the controller 71.

The controller 71 is a processing unit that controls the entire microscope device 1. The controller 71 performs various types of control and processing on the basis of a control program stored in the storage unit 73. The controller 71 includes an arithmetic unit such as a central processing unit (CPU). The input unit 72 receives various types of information, including information about the offset value OS, in accordance with an operation of the user. The storage unit 73 stores the image data of each sample 2. The storage unit 73 also stores the control program for causing the controller 71 to perform various types of control and processing.

Figure 2:
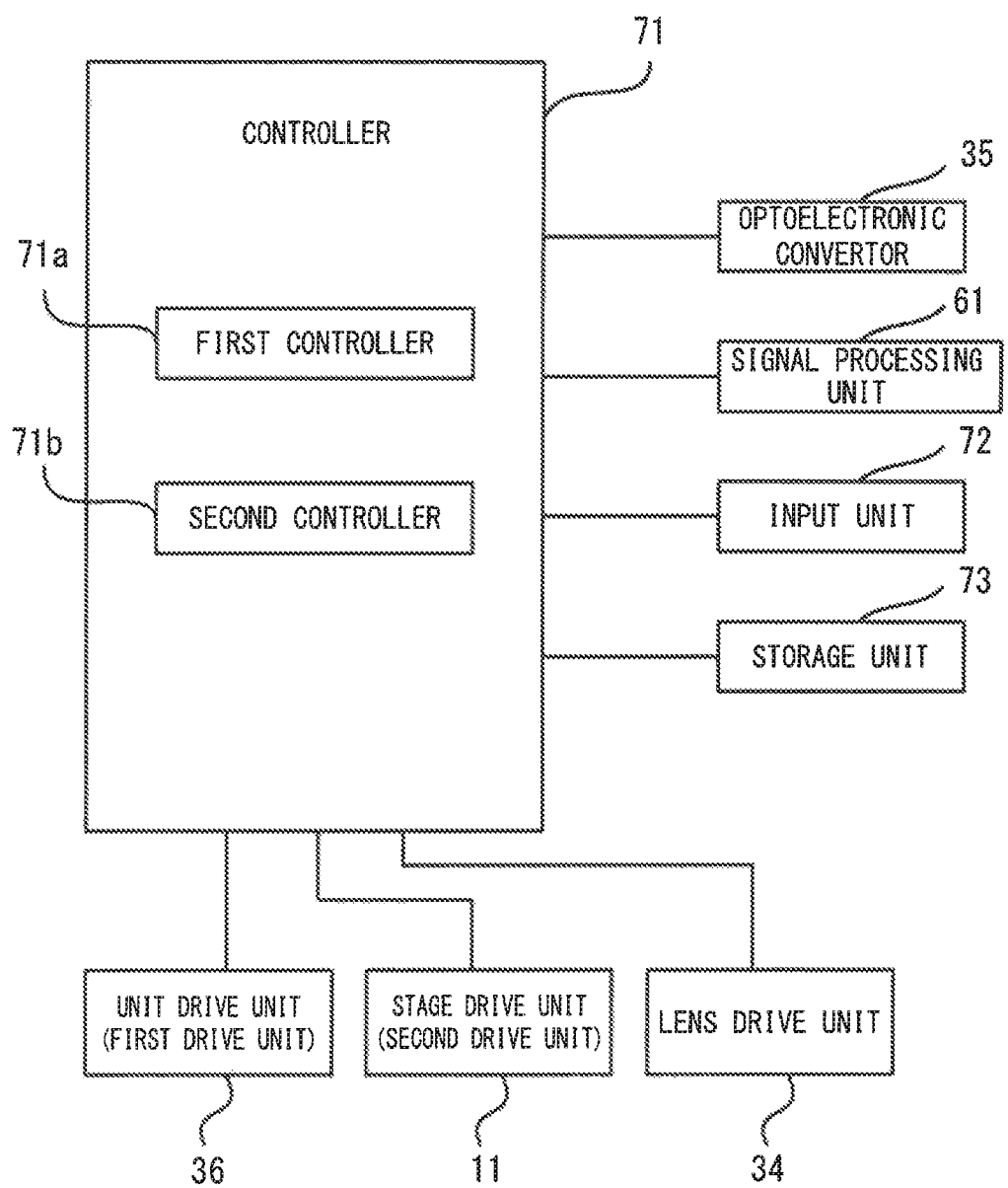
FIG. 2 is a block diagram showing the configuration of the control system of the microscope device of the first. embodiment.

FIG. 2 is a block diagram showing the configuration of the control system of the microscope device 1 of the first embodiment. In the configuration shown in FIG. 2, the same elements as those shown in FIG. 1 are given the same reference signs, and such elements will not be described repeatedly. As shown in FIG. 2, the controller 71 includes a first controller 71a and a second controller 71b.

The first controller 71a outputs a control signal to the stage drive unit 11 to drive the stage drive unit 11. Thus, the XY stage 10 is moved in the X- and Y-directions so that a well whose image is to be captured is located in a position facing the objective lens 21. Also, while the XY stage 10 is moved, the first controller 71a detects a reflected image on the basis of a detection signal from the optoelectronic converter 35 and recognizes the position of the reflection surface 3a on the basis of the detected reflected image. The first controller 71a then performs focus maintenance control for maintaining the focal position F in a reference position distant from the recognized position of the reflection surface 3a in the Z-direction by a predetermined distance (the offset value OS). Specifically, the first controller 71a maintains the focal position F in the reference position by outputting control signals to the lens drive unit 34 and unit drive unit 36 and thus maintaining the lens drive unit in a predetermined position and driving the unit drive unit 36.

The second controller 71b performs image AF (automatic focusing) control for changing the focal position F to the position of the sample surface 2a on the basis of the contrast signals of the images of the samples acquired from the signal processing unit 61. Specifically, while the XY stage 10 is not moved (that is, in the time period when the image capture unit 60 is capturing images), the second controller 71b detects the position of the sample surface 2a on the basis of the contrast signals from the signal processing unit 61. More specifically, the second controller 71b detects a Z-direction position such that the contrast of the image of the sample 2 is maximized, as the position of the sample surface 2a on the basis of contrast signals of images of each sample captured in multiple Z-direction positions and moves the focal position F to the detected position of the sample surface 2a. At this time, the second controller 71b moves the focal position F to the position of the sample surface 2a. by outputting a control signal to the unit drive unit 36 to drive the unit drive unit 36.

The focus adjustment device included in the microscope device 1 consists of the XY stage 10, image-forming optical system 20 (objective lens 21, image-forming lens 22), interface detector 30, image capture unit 60, signal processing unit 61, drive units 11, 34, and 36, controller 71, and the like.

Figure 3:
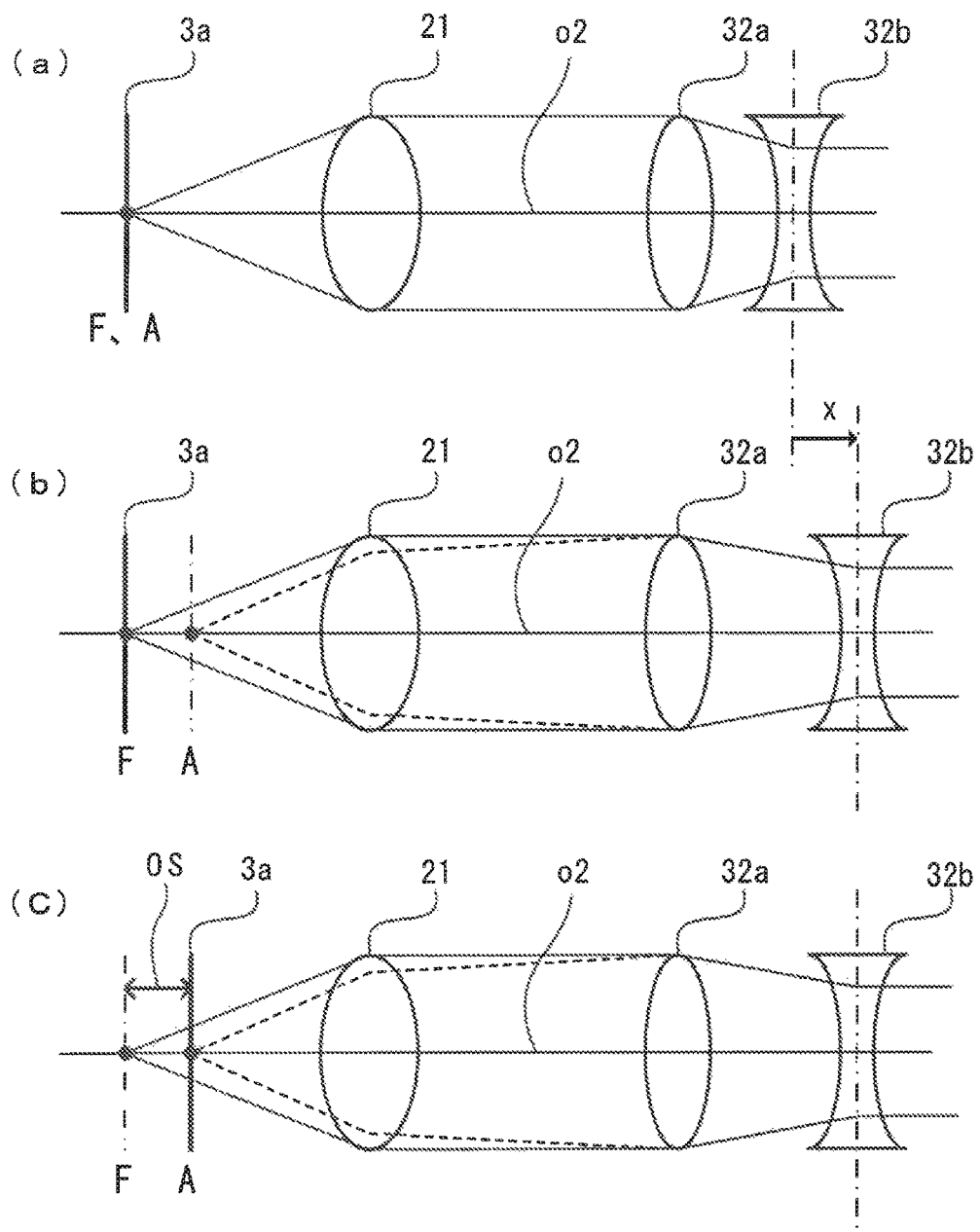
FIG. 3 includes diagrams showing the focus state of a reflected image when an offset lens is moved, in which FIG. 3(*a*) is a diagram showing a stat: in which an offset value is 0.

Next, the operation of the offset lens 32 will be described. FIG. 3 includes diagrams showing the focus state of the reflected image when the offset lens has been moved, in which FIG. 3(a) a diagram showing a state in which the offset value is 0; FIG. 3(b) is a diagram showing a state in which the offset lens has been moved; and FIG. 3(c) is a diagram showing a state in which the focal position has been adjusted.

Note that only elements necessary to show the operation of the offset lens 32 are shown in FIG. That is, the dichroic mirror 33 is not shown in FIG. 3. In FIG. 3, the offset lens 32 consists of the convex lens 32a and concave lens 32b. Although not shown in FIG. 1, the focusing optical system 30A includes a collector lens that converts infrared light from the first light source 31 parallel rays or approximately parallel rays. In FIG. 3, infrared light is shown by a dotted line, and illumination light and signal light are shown by solid lines.

The offset lens 32 has a function of moving, in the Z-direction, the image-formed position A of the light image based on the infrared light applied to the reflection surface 3a through the objective lens 21 by moving in the direction of the second optical axis O2. By moving the image-formed position A of the light image in this manner, the image-formed position of the reflected image of the light image reflected the reflection surface 3a is also moved in the direction of the second optical axis O2.

In FIG. 3(a), the image-formed position A the light image based on the infrared light is located on the reflection surface 3a. Also, the position of the concave lens 32b in the direction of the second optical axis O2 and the position of the objective lens 21 (and the interface detector 30) in the Z-direction (in the direction of the first optical path O1) are adjusted so that the focal position F of the objective lens 21 is also located on the reflection surface 3a. Note that the parfocal distance of the objective lens 21 is the predetermined distance, and the focal position of the objective lens 21 is also distant from the mounting plane of the objective lens 21 by the predetermined distance. This state is a stats in which the offset value OS is 0.

In FIG. 3(b), the concave lens 32b moves toward the first light source 31 side of the direction of the second optical axis O2 by a distance x and thus the image-formed position A of the light image based on the infrared light moves from the position of the reflection surface 3a in the Z-direction so as to approach the objective lens 21. In this state, the image-formed position A and the focal position F located on the lower surface 3a are displaced from each other.

In FIG. 3(c), the objective lens 21 (and the interface detector 30) moves toward the sample 2 in the Z-direction, Thus, the image-formed position A of the light image based on the infrared light moves to the position of the reflection surface 3a, and the focal position F of the objective lens 21 also moves in the Z-direction by the same distance. FIG. 3(c) shows that the sample is relatively moving in the Z-direction. In this state, the image-formed position A is located on the reflection surface 3a, and the image-formed position A and focal position F are displaced from each other. The amount of displacement between the image-formed position A and focal position F (the distance from the image-formed position A to the focal position F) is the offset value OS.

As seen above, the first controller 71a is able to adjust the offset value OS by moving the offset lens 32 (the concave lens 32b) in the direction of the second optical axis O2. The second controller 71b is able to always adjust the focal position F of the objective lens 21 to the position distant from the reflection surface 3a in the Z-direction by the predetermined distance (the predetermined amount) by moving the objective lens 21 (and the interface detector 30)

in the Z-direction so that the image-formed position A is located on the reflection surface 3a.

Figure 4:
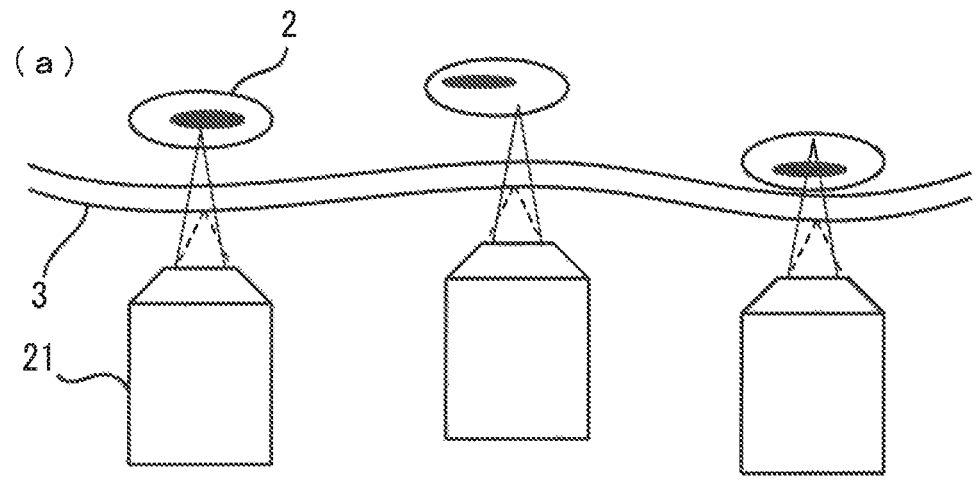
FIG. 4 includes diagrams showing an operation in which focus adjustment is performed so as to follow the wave of a microplate, in which FIG. 4(*a*) is a diagram showing a case in which only focus maintenance control is performed.
Figure 4:
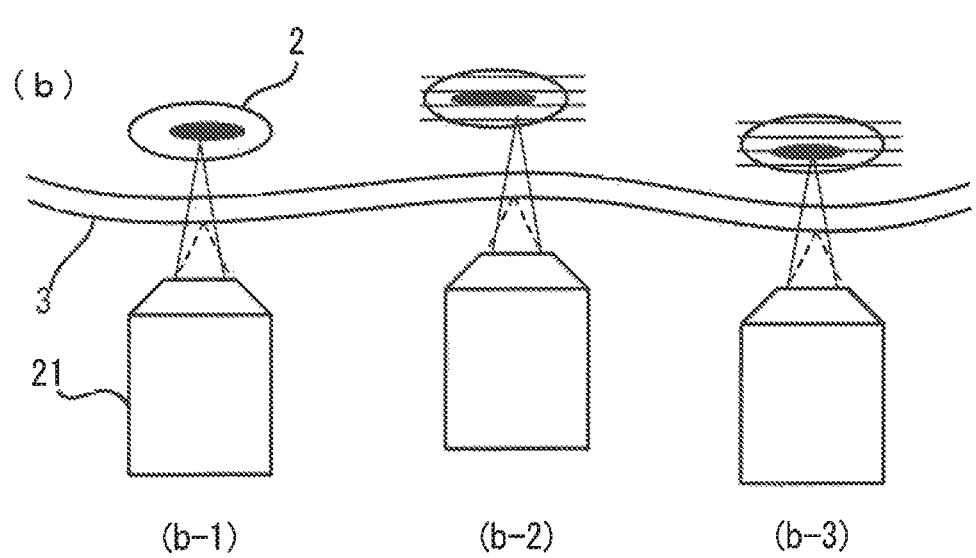

Next, the present invention will be outlined. FIG. 4 includes diagrams showing an operation in which the focus is adjusted so as to follow the wave of the lower surface of the microplate 3, in which FIG. 4(a) is a diagram showing a case in which only focus maintenance control is performed; and FIG. 4(b) is a diagram showing a case in which both focus maintenance control and image AF control are performed.

As described above, the microplate 3 is formed of plastic. For this reason, as shown in FIGS. 4(a) and 4(b), the bottom of the microplate 3 makes a wave of, for example, 10 to 200 μm. As shown in FIGS. 4(a-1) to 4(a-3), if the first controller 71a performs only focus maintenance control, the first controller 71a is able to always maintain the focal position F of the objective lens 21 in the position distant from the reflection surface 3a in the Z-direction y the predetermined distance so as to follow the wave of the reflection surface 3a (the lower surface of the microplate 3).

However, the position of a sample 2 in a well is not always constant. As shown in FIG. 4(a-2), a sample 2 may be located in a higher position than the position shown in FIG. 4(a-1) with respect to the lower surface, or as shown in FIG. 4(a-3), a sample 2 may be located in a lower position than the position shown in FIG. 4(a-1) (a position closer to the lower surface). At this time, if the objective lens 21 has a low magnification and a sample 2 is present in a relatively constant position with respect to the position of the reflection surface 3a, the displacement of the sample 2 in the Z-direction falls within the focal depth of the objective lens 21. Accordingly, the focus can be adjusted favorably by simply performing focus maintenance control. On the other hand, if the objective lens 21 has a magnification of 10× or more, the focus cannot be adjusted favorably by simply performing focus maintenance control.

For this reason, the second controller 71b temporarily stops focus maintenance control being performed by the first controller 71a and performs image AF control. Specifically, as shown in FIGS. 4(b-1) to 4(b-3), the first controller 71a always maintains the focal position F of the objective lens 21 in the position distant from the reflection surface 3a in the Z-direction by the predetermined distance so as to follow the wave of the reflection surface 3a; on the other hand, as shown in FIGS. 4(b-2) and 4(b-3), the second controller 71b starts to acquire contrast signals at predetermined intervals in a predetermined range in the Z-direction from the reference position (the focal position F), which is the position distant from the reflection surface 3a by the predetermined distance. The second controller 71b then obtains the most appropriate focal position F (a new focal position) having the highest contrast value on the basis of the acquired contrast signals and acquires an image in that position. According to this configuration, the focal position F can be accurately adjusted to the position of the sample 2 (the sample surface 2a) in the well. Also, if the reflection surface 3a, for example, is used as the reference position, image AF is performed not from this reference position but from the new focal position. Thus, the scanning range in the Z-direction is limited to a predetermined range. As a result, the focal position can be adjusted in a short time.

The microscope device acquires images of each sample 2 on various experiment conditions and then analyzes the acquired images. Thus, the reaction of each sample 2 is analyzed. While there are microplates 3 having as few as six wells, there are microplates 3 having as many as 1000 or more wells. Accordingly, the microscope device tray have to acquire many images. Also, the microscope device may acquire images of one well in different multiple fields of view. The microscope device may also acquire multiple images having different wavelength channels in the same field of view. In these cases, the microscope device may have to acquire several tens of thousands of images on one occasion.

For this reason, it is important to acquire images in a short time. If an observation sample 2 is a living cell, the state of the sample 2 would be changed while images thereof are captured. In this case, it is necessary to acquire images on the same experiment conditions by acquiring all images in a short time. It is also important to acquire high-quality images. Acquiring high-quality images requires capturing images of the sample 2 in a proper focal position.

In the methods described in above Patent Literatures 1 and 2, the system detects the position of the reflection surface 3a, temporarily adjusts the focal position to the detected position, then moves the focal position in the Z-direction by a predetermined distance, and then performs image AF control. According to these methods, the system has to perform many operations, as well as has to travel a long distance in the Z-direction. For example, if there are 1000 wells, these operations must be performed at least 1000 times. In this case, it is difficult to adjust the focal position for each well in a short time. It is also difficult to observe the entire microplate in a short time. It is conceivable that a main reason why it takes time to adjust the focal position F to the sample surface 2a is that it takes time to move in the Z-direction. On the other hand, accurately performing AF operation requires accurately performing position control in the Z-direction. As seen above, it is not easy to achieve both the accuracy of position control and a high moving speed.

Next, the operation of the microscope device 1 will be described.

Figure 5:
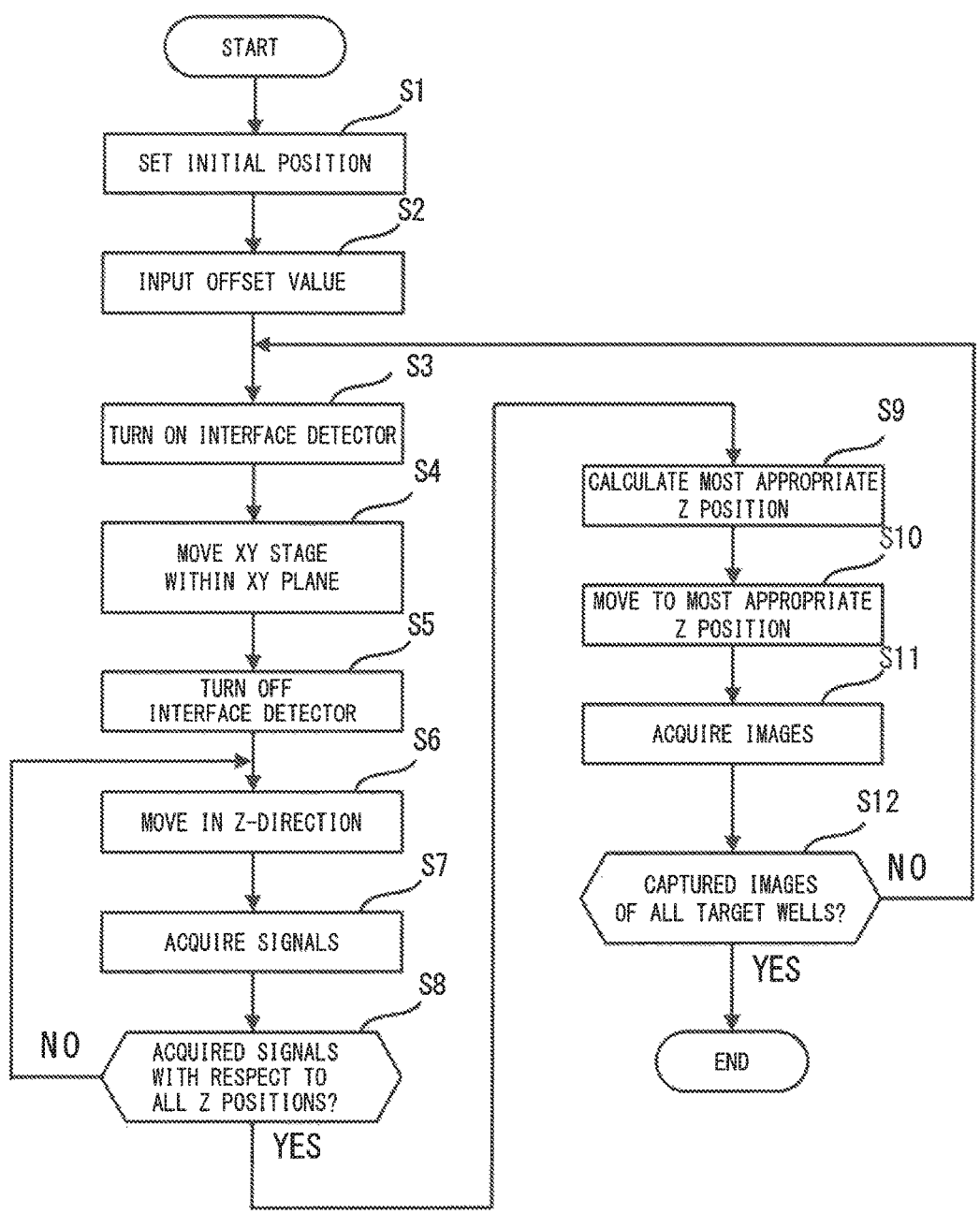
FIG. 5 is a flowchart showing a focus adjustment method of the first embodiment.

FIG. 5 is a flowchart showing a focus adjustment method of the first embodiment. In a process shown in FIG. 5, the first controller 71a first sets the position of the XY stage to the initial position (to the position in which the first controller 71a starts to control the drive of the stage drive unit 11) (step S1). Specifically, the first controller 71a outputs a control signal to the stage drive unit 11 to move the XY stage 10 to the initial position within the XY-plane.

Then, the first controller 71a receives the offset value OS through the input unit 72 (step S2). The offset value OS inputted in this process is a value predetermined with respect to a sample 2 whose image is to be captured. Or, the offset value OS is an optimum offset value with which focus is achieved when the user visually searches for an observation sample while manually moving the offset lens 32 and objective lens 21 by operating a controller or the like.

Then, the first controller 71a turns on the interface detector 30 (step S3). Thus, the interface detector 30 detects the position of the reflection surface 3a and outputs a detection signal corresponding to the detected position of the reflection surface 3a to the first controller 71a. The first controller 71a then outputs a control signal to the lens drive unit 34 to move the offset lens 32 to a position such that the difference between the image-formed position A and focal position F becomes the offset value OS inputted in step S2 [see FIG. 3(b)]. The first controller 71a also recognizes the position of the reflection surface 3a on the basis of the detection signal from the optoelectronic converter 35. The first controller 71a then outputs a control signal corresponding to the recognized position of the reflection surface 3a to the unit drive unit 36 to move the objective lens 21 to a posy n such that the image-formed position A of a light image becomes the position of the reflection surface 3a [see FIG. 3(c)].

The first controller 71a also outputs a control signal to the stage drive unit 11 to move the XY stage 10 within the XY-plane (step S4). Specifically, if the XY stage 10 is located in the initial position, the first controller 71a moves the XY stage 10 within the XY-plane in such a manner that the position of a well whose e is to be captured first is moved from the initial position to a position facing the objective lens 21. If the XY stage 10 is not located in the initial position, the first controller 71a moves the XY stage 10 within the XY-plane in such a manner that the position of a well whose image is to be captured next is moved to the position facing the objective lens 21.

The time period when the XY stage 10 is moving (the observation position is moving) in step S4 corresponds to the time period when the image capture unit 60 is not capturing images. During this period, the interface detector 30 is on. Accordingly, the first controller 71a controls the drive of the unit drive unit 36 so that the focal position F of the objective lens 21 is always maintained in the position distant from the reflection surface 3a in the Z-direction by the predetermined distance (the offset value OS) so as to follow the wave of the reflection surface 3a. Note that in the present embodiment, while the XY stage 10 moves, the offset value OS is not changed and therefore the first controller 71a does not control the drive of the lens drive unit 34.

When the movement of the XY stage 10 is complete in step S4, the first controller 71a temporarily turns off the interface detector 30 (step S5). Thus, the interface detector 30 stops detecting the position of the reflection surface 3a. The time period from when the interface detector 30 is turned off to when an image is acquired (that is, the time period when steps S6 to S11 are being performed) corresponds to the time period when the image capture unit 60 is capturing images.

Subsequently, the second controller 71b starts to perform image AF control. Specifically, the second controller 71b outputs a control signal to the unit drive unit 36 to move the objective lens 21 and interface detector 30 at predetermined intervals within a predetermined range in the Z-direction (step S6). The second controller 71b then captures images of the observation sample in positions at the predetermined intervals in the Z-direction and acquires contrast signals generated by the signal processing unit 61 (step S7). Te second controller 71b then determines whether contrast signals have been acquired with respect to all positions within the predetermined range (step S8). If it determines that contrast signals have not been acquired with respect to all positions within the predetermined range (NO in step S8), the second controller 71b repeats steps S6 and S7 until it determines that contrast signals have been acquired with respect to all positions within the predetermined range. As used herein, the term "the predetermined range" refers to a predetermined range including the focal position F of the objective lens 21, which is a position distant from the reflection surface 3a in the Z-direction by the predetermined distance (the offset value OS) and is a range in which the observation sample is assumed to b, present. Since the position of the observation sample is set to the position distant from the reflection surface 3a in the Z-direction by the predetermined distance (the offset value OS), the predetermined range need not cover the position of the reflection surface 3a.

On the other hand, it determines that contrast signals have been acquired with respect to all positions within the predetermined range (YES in step S8), the second controller 71b calculates a Z-direction position most appropriate as the position of the sample surface 2a on the basis of the contrast signals acquired in step S7 (step S9). For example, the second controller 71b calculates, as the position of the sample surface 2a, a Z-direction position such that the contrast of the image of the sample 2 is maximized. The second controller 71b then outputs a control signal to the unit drive unit 36 to move the objective lens 21 and interface detector 30 in such a manner that the focal position F becomes the most appropriate Z-direction position calculated in step S9 (the position of the sample surface 2a) (step S10).

The second controller 71b then acquires an image in a state in which the focal position F is to position of the sample surface 2a (step S11). For example, the second controller 71b instructs, through the signal processing unit 61, the image capture unit 60 to capture an image. The image capture unit 60 captures an image of the sample 2 on the basis of the instruction from the second controller 71b. The signal processing unit 61 generates image data on the basis of an image signal from the image capture unit 60 and outputs the generated image data to the second controller 71b. The second controller 71b stores the acquired image data in the storage unit 73.

Then, the second controller 71b determines whether images of all wells whose images are to be captured (that is, all samples 2 whose images are to be captured) have been captured S12). If the second controller 71b determines that images of all wells whose images are to be captured have not been captured (NO in step S12), the first controller 71a and second controller 71b repeat steps S3 to S11. On the other hand, if the second controller 71b determines that images of all wells whose images are to be captured have been captured (YES in step S12), the process ends.

While, in the first embodiment, the controller 71 moves the objective lens 21 (and the interface detector 30) in the Z-direction, the controller 71 only has to move at least one of the objective lens 21 and XY stage 10 (that is, the sample 2) in the Z-direction. That is, the controller 71 may move only the objective lens 21 in the Z-direction, or may move only the XY stage 10 in the Z-direction, or may move both the objective lens 21 and XY stage 10 in the Z-direction.

As described above, the microscope device 1 of the first embodiment includes the interface detector 30 that detects the position of the interface 3a of each observation object 2, the first controller 71a that, while the image capture unit 60 does not capture images, performs focus maintenance control for maintaining the focal position F in the reference position distant from the interface 3a detected by the interface detector 30 in the direction of the first optical path O1 by the predetermined distance (the offset value OS), and the second controller 71b that, in the time period when the image capture unit 60 is capturing images, moves at least one of the objective lens 21 and observation object 2 in the direction of the first optical path O1 to change the focal position F from the reference position to the position 2a of the observation object 2. According to this configuration, the range scanned by the second controller 71b in the direction of the first optical path O1 when performing control (image AF control) is limited to the predetermined range (a range near the reference position). Thus, the second control unit 71b is able to adjust the focal position in a short time. Also, the second control unit 71b is able to accurately adjust the focal position F to the position 2a of the observation object 2 and therefore is able to acquire high-quality images.

Typically, when the controller performs image AF control, it has to move the objective lens in the -direction in a range of at least 10 µm or so in order to acquire images. As described above, the controller 71 of the present embodiment scans the predetermined range around the focal position F, which is the reference position distant from the interface 3a in the direction of the first optical path O1 by the predetermined distance (the offset value OS). Thus, it is able to detect an appropriate focal position F by moving by ±2 µm and significantly improves efficiency.

The microscope device 1 of the first embodiment includes the first drive unit 36 that moves at least one of the objective lens 21 and observation object 2 in the direction of the first optical path O1. The first controller 71a performs focus maintenance control by controlling the drive of the first drive unit 36. The second controller 71b changes the focal position F from the reference position to the position 2a of the observation object 2 by controlling the drive of the unit drive unit 36. According to this configuration, focus maintenance control by the first controller 71a and change control of the focal position. F (image AF control) by the second controller 71b can be performed by controlling the drive of the same drive unit 36.

In the first embodiment, the second controller 71b detects the position 2a of each observation object 2 and changes the focal position F to the detected position 2a of the observation object 2. According to this configuration, the focal position F can be reliably changed to the position 2a of the observation object 2 and thus high-quality images can be reliably acquired.

In the first embodiment, the second controller 71b detects the position 2a of each observation object 2 on the basis of signals acquired by the image capture unit 60 while at least one of the objective lens 21 and observation object 2 moves. According to this configuration, the detection accuracy of the position 2a of the observation object 2 is ensured.

The microscope device 1 of the first embodiment includes the second drive unit 11 that moves each observation object 2 into a plane (the XY-plane) perpendicular to the direction of the first optical path O1. The first controller 71a performs focus maintenance control while the stage drive unit 11 moves the observation object 2. The second controller 71b changes the focal position F from the reference position to the position 2a of the observation object 2 while the second drive unit 11 stops moving the observation object 2. According to this configuration, it is possible to perform focus maintenance control while following the movement of the observation object 2, as well as to reliably detect the position 2a of the observation object 2 and to move the focal position F to the detected position 2a while the movement of the observation object 2 is stopped.

In the first embodiment, the second controller 71b moves at least one of the objective lens 21 and observation object 2 in the direction of the first optical path O1 while the interface detector 30 stops detecting the interface 3a. According to this configuration, the focal position F can be changed to the position 2a of the observation object 2 without having to move the lens 32 by only moving at least one of the objective lens 21 and observation object 2.

The microscope device 1 of the first embodiment includes the input unit 72 that receives the value of a predetermined distance (the offset value OS). The first controller 71a performs focus maintenance control on the basis of the value received by the input unit 72. According to this configuration, the value of the predetermined distance can be set with a simple operation.

The acquisition of contrast signals (see steps S6, S7) by the second controller 71b in the first embodiment may be as follows: the second light source 40 applies ultraviolet (UV) light as illumination light to a cell nucleus; the image capture unit 60 receives, as signal light, fluorescence excited by the UV light; and the signal processing unit 61 generates contrast signals indicating the contrast of images of the cell nucleus. The acquisition of images (see step 11) by the second controller 71b may be as follows: the second light source 40 applies UV light as illumination light to a cell nucleus; the image capture unit 60 receive, as signal light, fluorescence excited by the UV light; and the signal processing unit 61 generates image data of the cell nucleus. The acquisition of images (see step 11) by the second controller 71b may also be as follows: the second light source 40 applies blue light to a cytoskeleton stained with fluorescein isothiocyanate (FITC); the image capture unit 60 receives, as signal light, fluorescence excited by the blue light; and the signal processing unit 61 generates image data of the cytoskeleton.

<Second Embodiment>

In the first embodiment, the second controller 71b performs image AF control (steps S6 to S10) with the interface detector 30 turned off (see step S5). In a second embodiment, on the other hand, a second controller 71b performs image AF control with an interface detector 30 remaining on (that is, while the interface detector 30 detects a reflection surface 3a). The configuration of a microscope device 1 of the second embodiment is similar to that shown in FIGS. 1 and 2.

Figure 6:
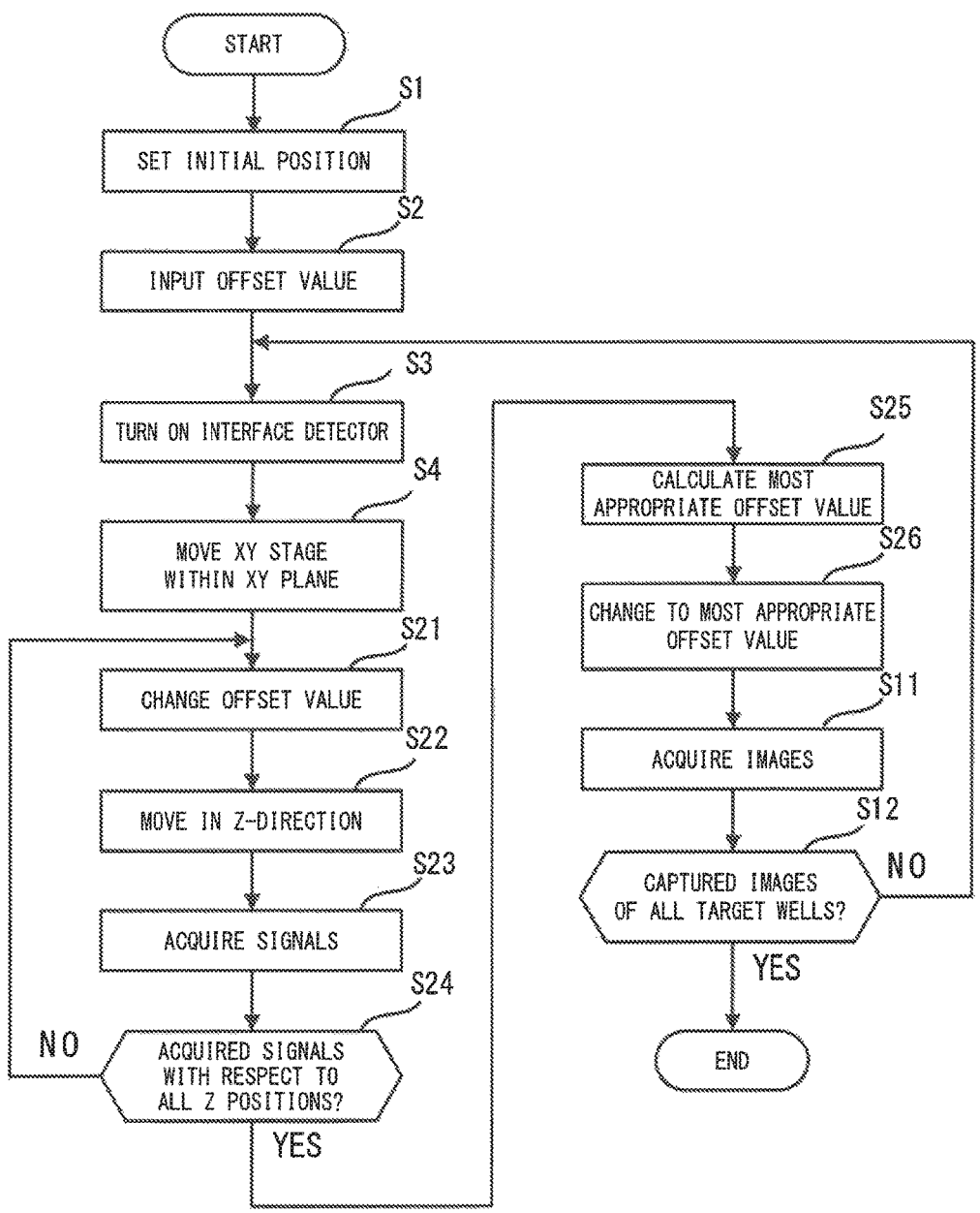
FIG. 6 is a flowchart showing a focus adjustment method of a second embodiment.

FIG. 6 is a flowchart showing a focus adjustment method of the second embodiment. Steps S1 to S4, S11, and S12 in FIG. 6 are similar to the steps shown in FIG. 5 and therefore are given the same reference signs and will not be described repeatedly.

In a process shown in FIG. 6, after step S4 is performed, the second controller 71b starts to perform mage AF control (steps S21 to S26) with the interface detector 30 remaining on. In this case, after the movement of an XY stage 10 is complete in step S4, the second controller 71b outputs a control signal to a lens drive unit 34 to move an offset lens 32, thereby changing an offset value OS (step S21). The second controller 71b also outputs a control signal to a unit drive unit 36 to move an objective lens 21 (and the interface detector 30) in the Z-direction in accordance with the change in the offset value OS with the image-formed position A of a light image adjusted to the position of the reflect surface 3a (step S22). For example, as shown in FIG. 3(*b*), when the second controller 71b moves a concave lens 32b in the direction of a second optical axis O2, the image-formed position A approaches the objective lens 21. If the second controller 71b attempts to maintain the state in which the image-formed position A is adjusted the position of the reflection surface 3a, it moves the objective lens 21 in such a manner that the objective lens 21 approaches the reflection surface 3a.

The second controller 71b then acquires contrast signals generated by a signal processing unit 61 with respect to positions at predetermined intervals in the Z-direction (step S23). The second controller 71b then determines whether contrast signals have been acquired with respect to all positions within a predetermined range (step S24). If it determines that contrast signals have not been acquired with respect to all positions within the predetermined range (NO in step S24), the second controller 71b repeats steps S21 to S23 until it determines that contrast signals have been acquired with respect to all positions within the predetermined range.

On the other hand, it determines that contrast signals have been acquired with respect to all positions within the predetermined range (YES in step S24), the second controller 71b calculates an offset value OS most appropriate as the position of the sample surface 2a on the basis of the contrast signals acquired in step S23 (step S25). For example, second controller 71b calculates, as the position of the sample surface 2a, an offset value OS such that the contrast of the image of the sample 2 is maximized. The second controller 71b then outputs control signals to a lens drive unit 34 and the unit drive unit 36 to move the offset lens 32 and objective lens 21 in such a manner that the focal position F becomes the most appropriate offset value OS calculated in step S25 (step S10). The second controller 71b then performs steps S11 and S12.

While, also in the second embodiment, a controller 71 moves the objective lens 21 (and the interface detector 30) in the Z-direction, the controller 71 only has to move at least one of the objective lens 21 and XY stage 10 (that is, the sample 2) in the Z-direction. That is, the controller 71 may move only the objective lens 21 in the Z-direction, or may move only the XY stage 10 in the direction, or may move both the objective lens 21 and XY stage 10 in the Z-direction.

As described above, in the second embodiment, the second controller 71b moves at least one of the objective lens 21 and observation object 2 in the direction of the first optical path O1 while the interface detector 30 detects the interface 3a. According to this configuration, the interface detector 30 detects the interface 3a while at least one of the objective lens 21 and observation object 2 moves. Thus, a limit can be imposed to the distance between the objective lens 21 and observation object 2 (the XY stage 10) on the basis of the detection of the interface 3a. As a result, the collision between the moving objective lens 21 and observation object 2 (XY stage 10) due to the movement thereof can be avoided.

In the second embodiment, the interface detector 30 includes an light source 31, a focusing optical system 30A that forms a light image based on light from the light source 31 on the interface 3a through the objective lens 21 and receives reflected light of the light image from the interface 3a through the objective lens 21 to form a reflected image of the light image and an optoelectronic converter 35 that is disposed in the image-formed position of the reflected image formed by the focusing optical system 30A and detects the reflected image. The focusing optical system 30A includes a lens 32 capable of moving the direction of a second optical axis O2 of the focusing optical system 30A. The second controller 71b changes the predetermined distance on the basis of a signal from the optoelectronic converter 35 by moving the lens 32 in the direction of the second optical axis O2 while causing the interface detector 30 to detect the interface 3a. The second controller 71b also moves at least one of the objective lens 21 and the observation object 2 in the direction of the first optical path O1 in accordance with the change in the predetermined distance. According to this configuration, the focal position F can be changed by moving the lens 32 while the interface detector 30 detects the interface 3a.

<Third Embodiment>

In the first embodiment, the first controller 71a performs focus maintenance control while the XY stage 10 moves (see steps S3, S4). In a third embodiment, on the other hand, focus maintenance control performed while image capture is waited for in time lapse observation (a method in which changes over a long period of time are observed by capturing images at predetermined intervals). Time lapse observation is also called interval observation.

Figure 7:
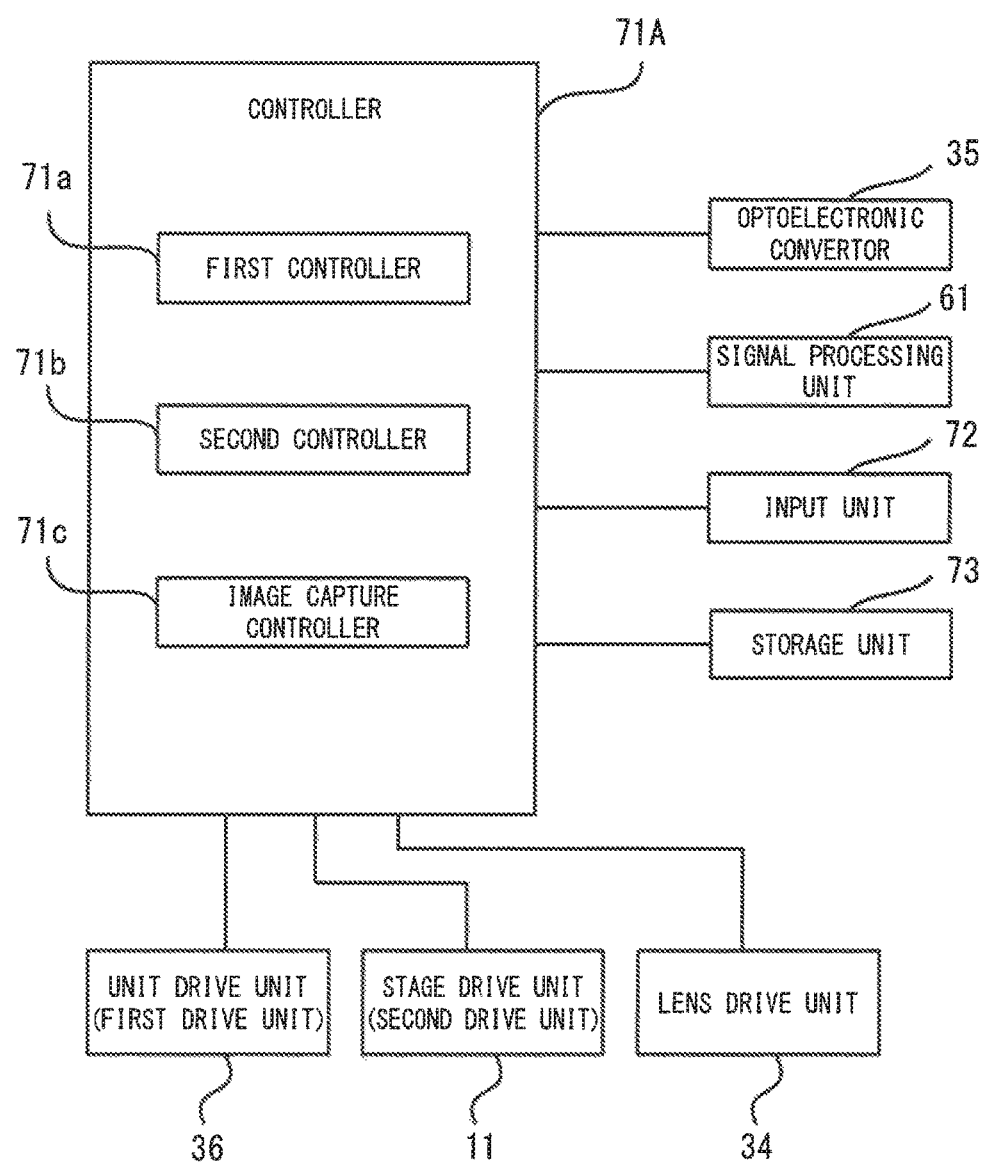
FIG. 7 is a block diagram showing the configuration of the control system of a microscope device of a third embodiment.

FIG. 7 is a block diagram showing the configuration of the control system of a microscope device 1 according to the third embodiment. As shown in FIG. 7, a controller 71A differs from the configuration shown in FIG. 2 in that it includes an image capture controller 71c. The image capture controller 71c is a processing unit that causes an image capture unit 60 to capture images of each sample 2 at predetermined time intervals. In the present embodiment, a first controller 71a performs focus maintenance control while the image capture controller 71c does not cause the image capture unit 60 to capture images. A second controller 71b changes a focal position F from a reference position to the position of a sample surface 2a in the time period when the image capture controller 71c is causing the image capture unit 60 to capture images. The other elements in FIG. 7 are similar to those shown in FIG. 2 and therefore are given the same reference signs and will not be described repeatedly.

Figure 8:
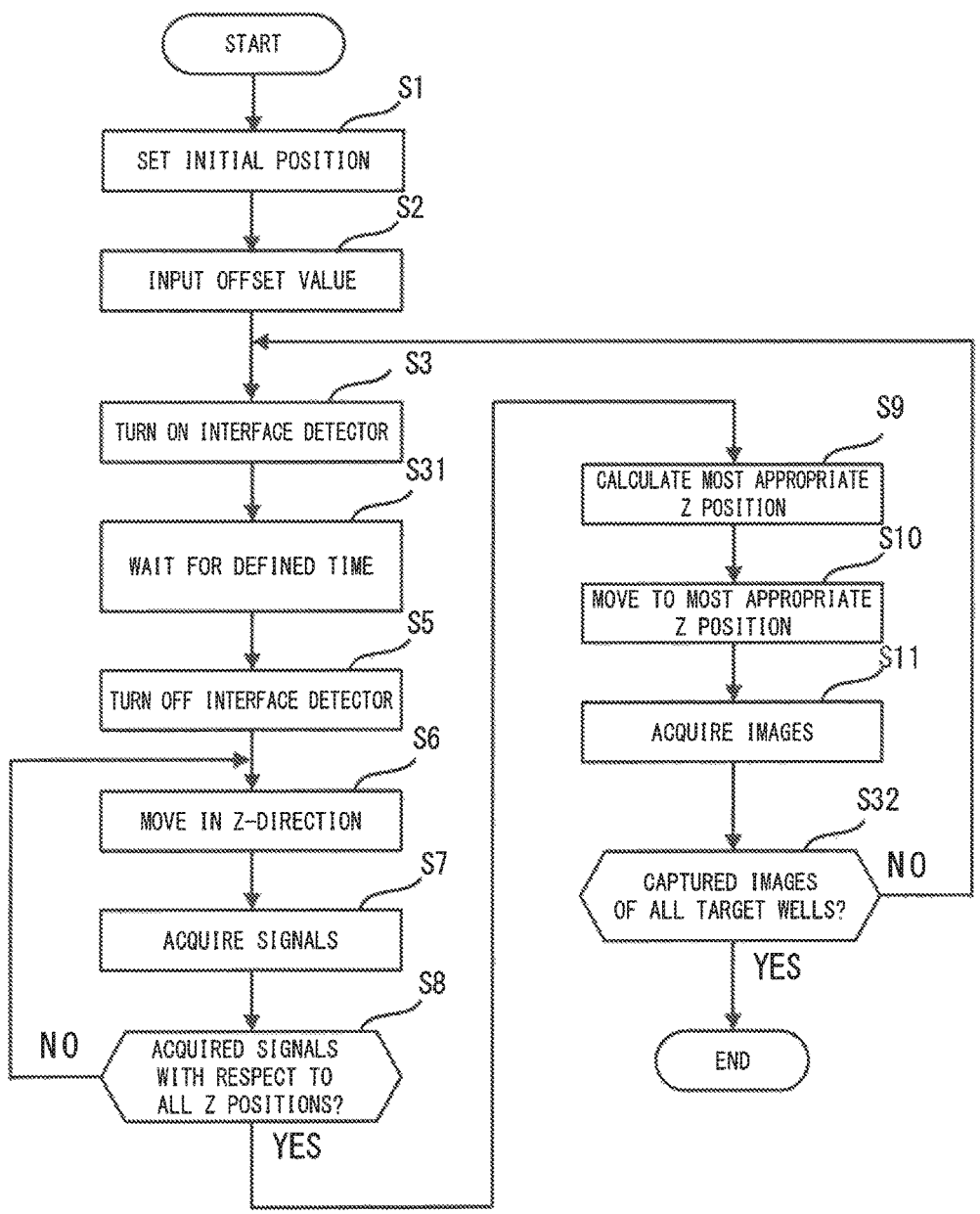
FIG. 8 is a flowchart showing a focus adjustment method of the third embodiment.

FIG. 8 is a flowchart showing a focus adjustment method of the third embodiment. Steps S1 to S3 and S5 to S11 in FIG. 8 are similar to the steps shown in FIG. 5 and therefore are given the same reference signs and will not be described repeatedly.

In a process shown in FIG. 8, after step S3 is performed, the image capture controller 71c waits to perform image AF control by a time defined in time lapse observation (e.g., several minutes several hours) (step S31). The time period when the image capture controller 71c is waiting for the defined time in step S31 corresponds to the time period when the image capture unit 60 is not capturing images During this period, an interface detector 30 is on (see step S3). Accordingly, the first controller 71a controls the drive of a unit drive unit 36 so that the focal position F of the objective lens 21 is always maintained in a position distant from a reflection surface 3a in the Z-direction by a predetermined distance (an offset value OS). Thus, even if the position of the sample 2 is changed due, for example, to the expansion of the XY stage 10 resulting from a long-time observation, it is possible to change the Z-direction position of the objective lens 21 in real time to follow the position change caused by the expansion of the XY stage 10 or the like. In the present embodiment, while the image capture controller 71c waits for the defined time, the offset value OS is not changed and therefore the first controller 71a does not control the drive of the lens drive unit 34.

When the defined time is elapsed in step S31, the first controller 71a temporarily turns off the interface detector 30 (step S5). Then, the second controller 71b performs image AF control (steps S6 to S10). In time lapse observation, the position of a sample 2 (e.g., a cell nucleus) may vertically change with a lapse of time. Accordingly, the position of the sample 2 in the current observation may be shifted from the position of the sample 2 in the previous observation. For this reason, the second controller 71b performs image AF control after the defined tide elapsed. The second controller 71b then acquires an image in a state in which the focal position is the position of the sample surface 2a (step S11).

The second controller 71b then determines whether image capture has been performed in all defined times (step S32). If the second controller 71b determines that image capture has not been performed in all defined times (NO in step S32), the first controller 71a and second controller 71b repeat step S3, step S31, and steps S5 to S11. On the other hand, if the second controller 71b determines that image capture has been performed in all defined times (YES in step S32), the process ends.

While, also in the third embodiment, a controller 71 moves the objective lens 21 (and the interface detector 30) in the Z-direction, the controller 71 only has to move at least one of the objective lens 21 and XY stage 10 (that is, the sample 2) in the Z-direction. That is, the controller 71 may move only the objective lens 21 in the Z-direction, or may move only the XY stage 10 in the Z-direction, or may move both the objective lens 21 and XY stage 10 in the Z-direction.

As seen above, the microscope device 1 of the third embodiment includes the image capture controller 71c that causes the image capture unit 60 to capture images of each observation object 2 at the predetermined intervals. The first controller 71a performs focus maintenance control while the image capture controller 71c does not cause the image capture unit 60 to capture images. The second controller 71b changes the focal position F from the reference position to the position 2a of the observation object 2 in the time period when the image capture controller 71c is causing the image capture unit 60 to capture images. According to this configuration, the focal position F is maintained while the image capture controller 71c waits in time lapse observation. Thus, the second controller 71b is able to change the focal position F from the reference position immediately after the image capture controller 71c completes the wait.

<Fourth Embodiment>

In the first, second, and third embodiments, the first controller 71a receives the offset value OS through the input unit 72. In a fourth embodiment, on the other hand, controller automatically searches for and set an offset value OS.

Figure 9:
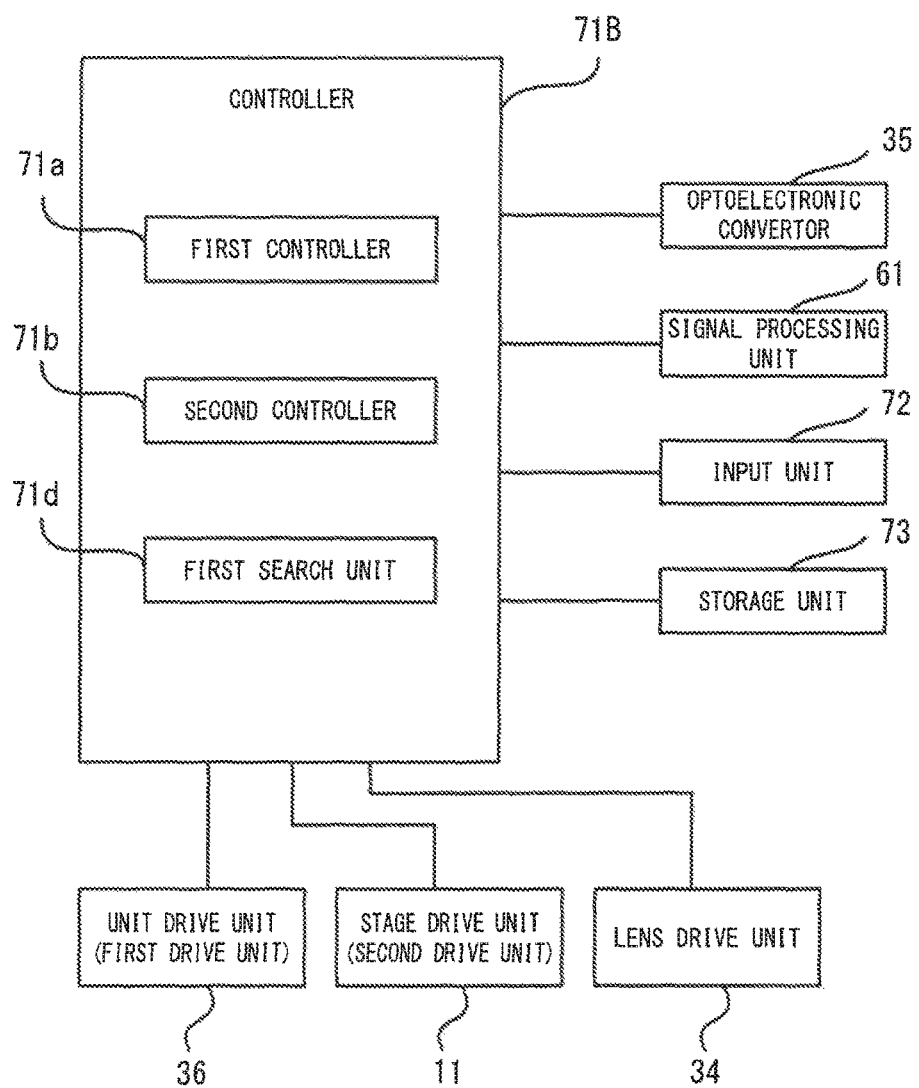
FIG. 9 is a block diagram showing the configuration of the control system of a microscope device of a fourth embodiment.

FIG. 9 is a block diagram showing the configuration of the control system of a microscope device 1 according to the fourth embodiment. As shown in FIG. 9, a controller 71B differs from the configurations shown in FIGS. 2 and 7 in that it includes a first search unit 71d. The first search unit lid is a processing unit that detects the position of a sample surface 2a by moving at least one of an objective lens 21 and a sample 2 in the direction of a first optical path O1, causes an interface detector 30 to detect an interface 3a, and obtains the value of a predetermined distance (an offset value OS) on the basis of the position of the sample surface 2a and the position of the interface 3a. In the present embodiment, a first controller 71a performs focus maintenance control on the basis of the value (the offset value OS) obtained by first search unit 71d. The other elements in FIG. 9 are similar to those shown in FIGS. 2 and 7 and therefore are given the same reference signs and will not be described repeatedly.

Figure 10:
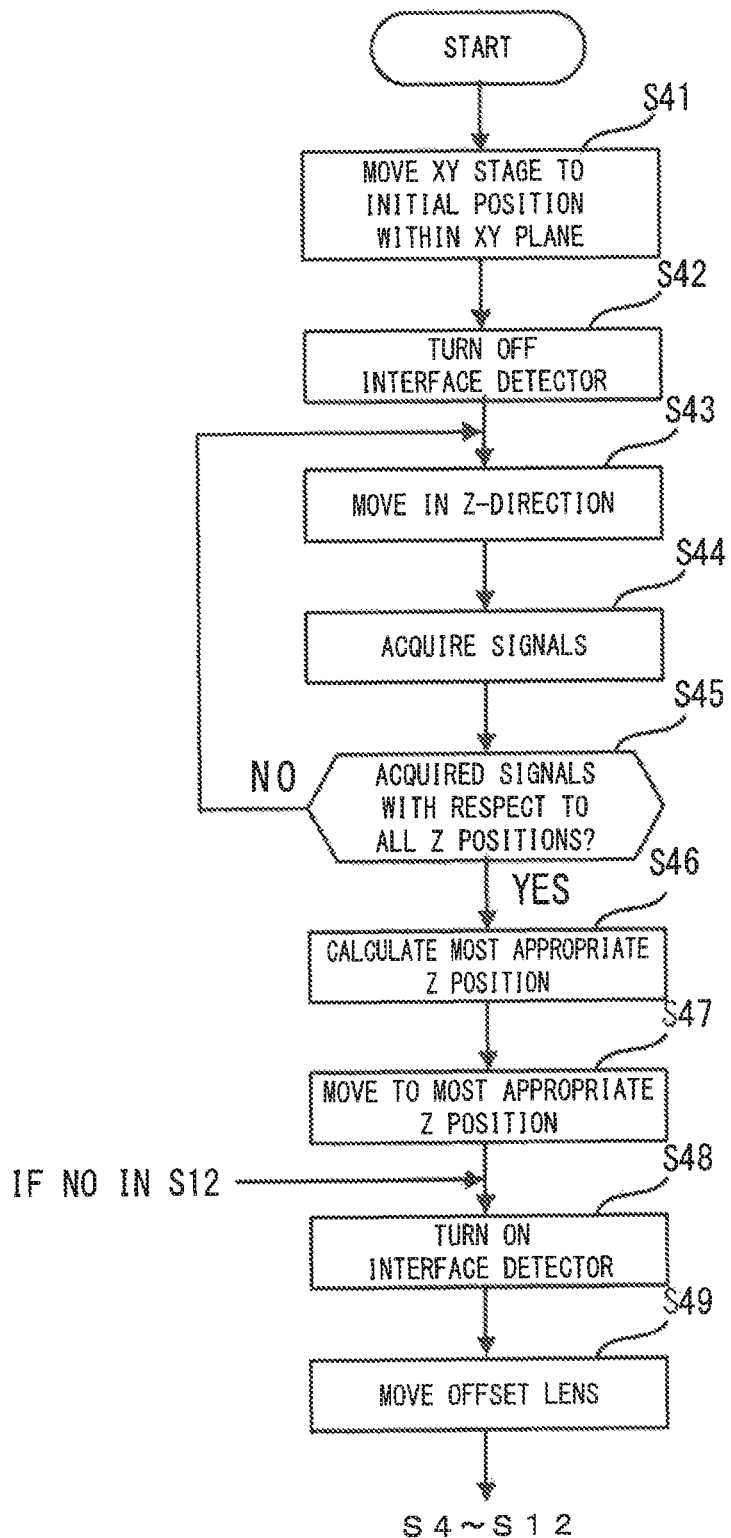
FIG. 10 is a flowchart showing a focus adjustment method of the fourth embodiment.

FIG. 10 is a flowchart showing a focus adjustment method of the fourth embodiment. Steps S4 to S12 in FIG. 10 are similar to the steps shown in FIG. 5 and therefore are given the same reference signs and will not be described repeatedly.

In a process shown in FIG. 10, the first controller 71a outputs a control signal to a stage drive unit 11 to move an XY stage 10 to the initial position within the XY-plane (step S41). Then, the first search unit 71d turns off the interface detector 30 (step S42). Thus, the interface detector 30 stops detecting the position of the reflection surface 3a.

Then, the first search unit 71d outputs a control signal to the unit drive unit 36 to move the objective lens 21 and interface detector 30 at predetermined intervals in the Z-direction (step S43). The first search unit 71d then acquires contrast signals generated by the signal processing unit 61 with respect to positions at the predetermined intervals in the Z-direction (step S44). The first search unit 71d then determines whether contrast signals have been acquired with respect to all positions (step S45). If it determines that contrast signals have not been acquired with respect to all positions (NO in step S45), the second controller 71b repeats steps S43 and S44 until it determines that contrast signals have been acquired with respect to all positions.

On the other hand, it determines that contrast signals have been acquired with respect to all positions (YES in step S45), the first search unit 71d calculates a Z-direction position most appropriate (having the highest contrast value) as the position of the sample surface 2a on the basis of the contrast signals acquired in step S44 (step S46). The first search unit 71d then outputs a control signal to the unit drive unit 36 to move the objective lens 21 and interface detector 30 in such a manner that the focal position F becomes the most appropriate Z-direction position (the position of the sample surface 2a) calculated in step S46 (step S47).

The first search unit 71d then turns on the interface detector 30 (step S48) and thus the interface detector 30 detects the position of the reflection surface 3a. The first search unit 71d then outputs a control signal to the lens drive unit 34 on the basis of a detection signal from the interface detector 30 to move the offset lens 32 in such a manner that the image-formed position A becomes the position of the reflection surface 3a (step S49) The first search unit 71d then sets the difference between the image-formed position A and focal position F as the offset value OS and outputs it to the first controller 71a. Then, the first controller 71a and second controller 71b perform steps S4 to S12.

While, also in the fourth embodiment, the controller 71 moves the objective lens 21 (and the interface detector 30) in the Z-direction, the controller 71 only has to move at least one of the objective lens 21 and XY stage 10 (that is, the sample 2) in the Z-direction. That is, the controller 71 may move only the objective lens 21 in the Z-direction, or may move only the XY stage 10 in the Z-direction, or may move both the objective lens 21 and XY stage 10 in the Z-direction.

As seen above, the microscope device 1 of the fourth embodiment includes the first search unit 71d that detects the position 2a of each observation object 2 by moving at least one of the objective lens 21 and observation object 2 in the direction of the first optical path O1, causes the interface detector 30 to detect the interface 3a, and obtains the value of the predetermined distance (the offset value OS) on the basis of the position 2a of the observation object 2 and the position of the interface 3a. The first controller 71a performs focus maintenance control on the basis of the value obtained by the first search unit 71d. According to this configuration, the first search unit 71d automatically searches for and sets the offset value OS and thus the user is able to save the time and effort to input the offset value OS.

In the fourth embodiment, while at least one of the objective lens 21 and observation object 2 moves, the first search unit 71d detects the position 2a of the observation object 2 on the basis of images captured by the image capture unit 60. According to this configuration, the accurate position 2a of the observation object 2 can be detected on the basis of the images and thus the accuracy of the value of the predetermined distance is improved.

Depending on the situation, the first search unit 71d of the fourth embodiment must search for the initial position 2a in a range of nearly 1000 μm. In this case, it takes time to search for the position 2a. As a result, it takes time to search for the offset value OS. However, it takes time to search for the offset value OS only at the first time. Accordingly, the time to capture images of all samples 2 is reduced. Typically, the position 2a is searched for by performing scanning in two stages. In the first stage, the first search unit 71d acquires contrast signals at intervals of 20 µm in a range of 1000 µm. In this case, the image capture unit 60 must acquire 500 images. In the second stage, the first search unit 71d acquires contrast signals at intervals of 2 µm in a range of 40 µm around a position having the highest contrast. At this time, the image capture unit 60 acquires 20 images. The first search unit 71d uses the position of an image having the highest contrast of the images, as the most appropriate Z-direction position.

<Fifth Embodiment>

In a fifth embodiment, as in the fourth embodiment, a controller automatically searches for and set an offset value OS. While, in the fourth embodiment, the first search unit 71d turns off the interface detector 30 and then searches for the offset value OS, in the fifth embodiment, a second search unit searches for an offset value OS with an interface detector 30 remaining on.

Figure 11:
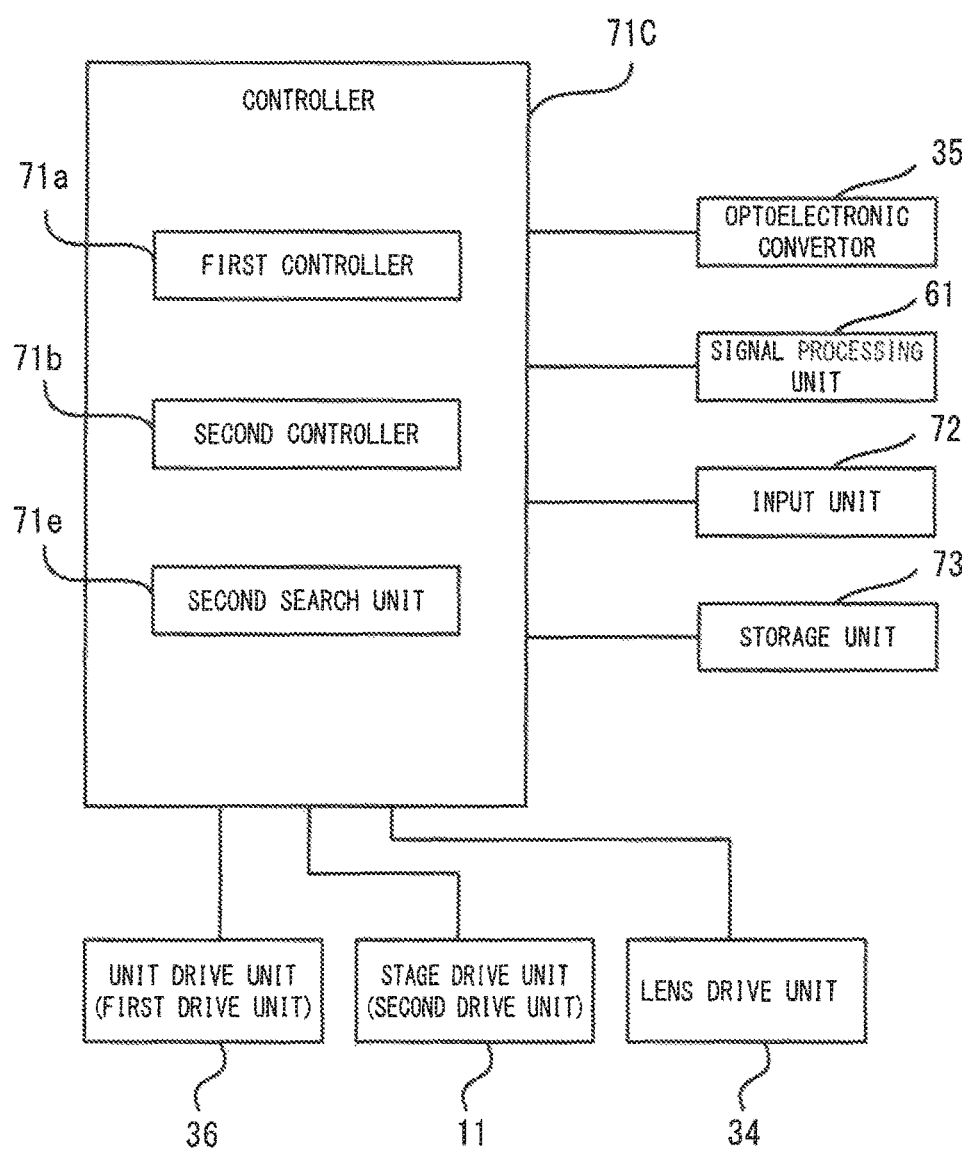
FIG. 11 is a block diagram showing the configuration of the control system of a microscope device of a fifth embodiment.

FIG. 11 is a block diagram showing the configuration of the control system of a microscope device 1 according to the fifth embodiment. As shown in FIG. 11, a controller 71C differs from the configurations shown in FIGS. 2, 7, and 9 in that it includes a second search unit 71e. The second search unit 71e detects a position 2a of an observation object 2 by moving at least one of an objective lens 21 and the observation object 2 in the direction of a first optical path O1 while causing the interface detector 30 to detect an interface 3a. The second search unit 71e obtains the value of a predetermined distance (the offset value OS) on the basis of the position 2a of the observation object 2 and the position of the interface 3a. in the present embodiment, a first controller 71a performs focus maintenance control on the basis of the value (the offset value OS) obtained by the second search unit 71e. The other elements in FIG. 11 are similar to those shown in FIGS. 2, 7, and 9 and therefore are given the same reference signs and will not be described repeatedly.

Figure 12:
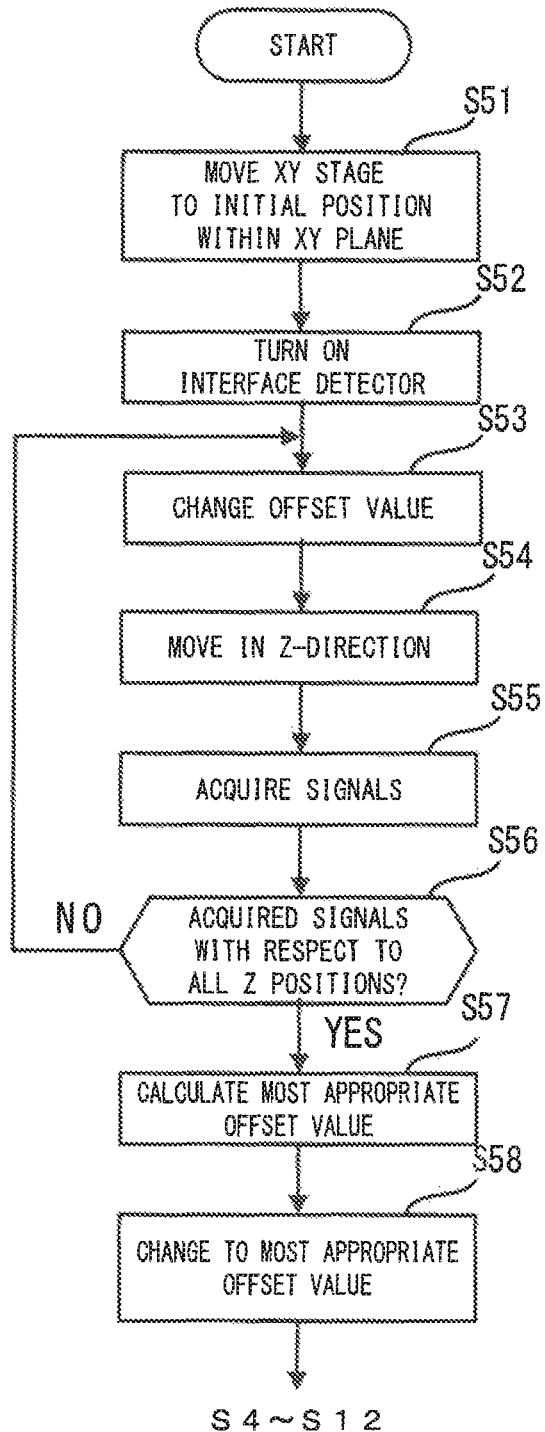
FIG. 12 is a flowchart showing a focus adjustment method of the fifth embodiment.

FIG. 12 is a flowchart showing a focus adjustment method of the fifth embodiment. Steps S4 to S12 in FIG. 12 are similar to the steps shown in FIG. 5 and therefore are given the same reference signs and will not be described repeatedly.

In a process shown in FIG. 12, the first controller 71a outputs a control signal to a stage drive unit 11 to move an XY stage 10 to the initial position within the KY-plane (step S51). Then, the second search unit 71e turns on the interface detector 30 (step S52). Thus, the interface detector 30 detects the position of the reflection surface 3a.

Then, the second search unit 71e outputs a control signal to a lens drive unit 34 with the interface detector 30 remaining on to move the offset lens 32, thereby changing the offset value OS to the initial value (step S53). At this time, it is appropriate that the initial value of the offset value OS be 0. The second search unit 71e then outputs a control signal to the unit drive unit 36 to move the objective lens 21 (and the interface detector 30) in the Z-direction in accordance with the change in the offset value OS with the image-formed position A of a light image adjusted to the position of the reflection surface 3a (step S54).

The second search unit 71e then acquires contrast signals generated by a signal processing unit 61 with respect to positions at predetermined intervals in the Z-direction (step S55). The second search unit 71e then determines whether contrast signals have been acquired with respect to all positions (step S56). If it determines that contrast signals have not been acquired with respect to all positions (NO in step S56), the second search unit 71e repeats steps S53 to S55 until it determines that contrast signals have been acquired with respect to all positions.

On the other hand, it determines that contrast signals have been acquired with respect to all positions (YES in step S56), the second search unit 71e calculates an offset value OS most appropriate as the position of the sample surface 2a on the basis of the contrast signals acquired in step S55 (step S57). For example, the second search unit 71e calculates, as the position of the sample surface 2a, an offset value OS such that the contrast of the image of the sample 2 is maximized. The second search unit 71e then outputs control signals to the lens drive unit 34 and unit drive unit 36 to move the offset lens 32 and objective lens 21 in such a manner that the focal position F becomes the most appropriate offset value OS calculated in step S57 (step S58). Then, the first controller 71a and second controller 71b perform steps S4 to S12.

While, also in the fifth embodiment, a controller 71 moves the objective lens 21 (and the interface detector 30) in the Z-direction, the controller 71 only has to move at least one of the objective lens 21 and XY stage 10 (that is, the sample 2) in the Z-direction. That is, the controller 71 may move only the objective lens 21 in the Z-direction, or may move only the XY stage 10 in the Z-direction, or may move both the objective lens 21 and XY stage 10 in the Z-direction.

As seen above, the microscope device 1 of the fifth embodiment includes the second search unit 71e that detects the position 2a of each observation object 2 by moving at least one of the objective lens 21 and observation object 2 in the direction of the first optical path O1 while causing the interface detector 30 to detect the interface 3a and obtains the value of the predetermined distance on the basis of the position 2a of the observation object 2 and the position of the interface 3a. The first controller 71a performs focus maintenance control on the basis of the value obtained by the second search unit 71e. According to this configuration, the second search unit 71e automatically searches for and sets the offset value OS and thus the user is able to save the time and effort to input the offset value OS. Also, the interface detector 30 detects the interface 3a while at least one of the objective lens 21 and observation object 2 moves. Thus, a limit can be imposed to the distance between the objective lens 21 and observation object 2 (the XY stage 10) on the basis of the detection of the interface 3a. As a result, the collision between the objective lens 21 and observation object 2 (the XY stage 10) due to the movement thereof can be avoided.

In the fifth embodiment, while at least one of the objective lens 21 and observation object 2 moves, the second search unit 71e detects the position 2a of the observation object 2 on the basis of images captured by the image capture unit 60. According to this configuration, the accurate position 2a of the observation object 2 can be detected on the basis of the images and thus the accuracy of the value of the predetermined distance is improved.

While the present invention has been described using the embodiments, the technical scope of the invention is not limited to the scope described in the embodiments. Various changes or modifications can be made to the embodiments without departing from the spirit and scope of the present invention. Further, one or more of the elements described in the embodiments may be omitted. Any forms resulting from such changes, modifications, or omission fall within the technical scope of the present invention. The elements of the embodiments or modifications thereof may be combined as appropriate and used.

Examples of combinations of the elements of the first to fifth embodiments include the following. There are three methods for obtaining the offset value OS: (1) the input of the offset value OS through the input unit 72 (see step S2); (2) the performance of image AF control with the interface detector 30 turned off (see steps S42 to S49); and (3) the performance of image AF control with the interface detector 30 remaining on (see steps S52 to S58). There are two time periods in which focus maintenance control is performed: (4) the time period when the XY stage 10 is moving (see steps S3, S4); and (5) the time period when the image capture controller 71c is waiting in time lapse observation (see steps S3, S31). There are two methods for performing image AF control: (6) the performance of image AF control with the interface detector 30 turned off; and (7) the performance of image AF control with the interface detector 30 remaining on. These methods may be used in combination as necessary.

While the optical microscope shown in FIG. 1 is an inverted microscope, the embodiments or modifications thereof may be applied to an erect microscope or the like. While a reflection illumination device is used as the illumination device of the optical microscope shown in FIG. 1, a transmission illumination device may be used.

While the microplate 3 is used as a container for containing the samples 2, such a configuration need not be used. For example, a configuration in which the samples 2 are sandwiched between cover glass and slide glass may be used. While the lower surface of the bottom of the microplate 3 is used as the interface 3a, the upper surface of the bottom of the microplate 3 may be used if the reflection of infrared light is strong.

By disposing a slit plate on the optical axis of the focusing optical system 30A, a slit image may be used as a light image applied to the reflection surface 3a. In this case, the controller detects the slit image on the basis of a detection signal from the interface detector 30a and recognizes the image-formed position A on the basis of the detected slit image. While an infrared LED that emits infrared light is used as the first light source 31, a light source that emits light with a wavelength different from that of infrared light (e.g., light with a longer wavelength than infrared light) may be used. While a line CCD sensor is used as the optoelectronic converter 35, a line complementary metal oxide semiconductor (CMOS) sensor may be used.

While the offset lens 32 is configured to change the image-formed position A when moving the concave lens 32b along the second optical axis O2, it may be configured to change the image-formed position A when moving the convex lens 32a along the second optical axis O2. It may be also configured to change the image-formed position A when moving both the convex lens 32a and concave lens 32b along the second optical axis O2.

All the elements of the focus adjustment device need not be disposed in the microscope device 1. For example, elements, such as controllers 71, 71A, 71B, and 71C, input unit 72, and storage unit 73, may be disposed in a device different from the microscope device 1, such as a computer. The microscope device 1 may be connected to an image analysis device, or a computer or the like including a control program for image analysis. While the control program for causing the controllers 71, 71A, 71B, and 71C to perform control and processing is stored in the storage unit 73, the control program may be stored in a storage medium.

The number of samples 2 whose images are captured by the image capture unit 60 on a single occasion is not limited to one and may be two or more. While a CCD sensor is used as the image capture unit 60, a CMOS sensor may be used in place of the CCD sensor.

While, when performing image AF control, the controller determines the focal position F on the basis of contrast signals generated by the signal processing unit 61, it may determine the focal position F on the basis of image data generated by the signal processing unit 61. While a fluorescent image is used when performing image AF control, the bright field of a transmission image, or a phase difference image may be used. While the image capture unit 60 acquires images (see step S11) and also acquires images for image AF control (see step S7 or the like), an image capture device for image AF control different the image capture unit 60 may be disposed. In this case, the same focal position is set for the image capture device for image AF control and the image capture unit 60. Also, it is preferred to use an image capture device that acquires images in a short time and has high sensitivity.

The signal processing unit 61 may generate contrast signals on the basis of one-dimensional image signals acquired by the image capture unit 60 rather than on the basis of two-dimensional image signals. In this case, a one-dimensional image sensor may be used as the image capture unit that acquires image signals. While the controller determines a position having the highest contrast as the focal position, it may determine a position having the highest signal strength as the focal position.

While the unit drive unit 36 moves the unit in which the objective lens 21 and interface detector 30 are combined, in the Z-direction, it may move only the objective lens 21 in the Z-direction. While a method of rotating an electric motor is conceivable as a method for driving the stage drive unit 11, lens drive unit 34, and unit drive unit 36, other driving methods may be used. For example, there may be used a method including mounting piezoelectric elements on the XY stage 10, the holding part of the offset lens and the mounting part of the objective lens 21 and moving these elements using the piezoelectric elements.

The controller may set an offset value with reference to the history of offset values. For example, the controller may retrieve the same experiment condition as the current experiment condition from the previous experiment conditions and use an offset value in the same experiment condition as an offset value in the current experiment condition. While the controller always performs focus maintenance control while each XY stage 10 moves, it may perform focus maintenance control only while an XY stage 10 in a predetermined ordinal position moves (e g., only while every other XY stage 10 moves). If the intervals between the defined times are short in time lapse observation, the controller may perform focus maintenance control only while the image capture controller 71c waits for a defined time in a predetermined ordinal position rather than always performing focus maintenance control while it waits each defined time.

The controller may update the offset value each time the XY stage 10 moves or each time the image capture controller 71c waits for the defined time. For example, if the offset value has been changed when capturing images of the previous sample 2, the controller may use the changed offset value in focus maintenance control when capturing images of the current sample 2.

DESCRIPTION OF REFERENCE SIGNS

1 . . . microscope device, 2 . . . sample (observation object), 3 . . . microplate (container), 10 . . . XY stage, 11 . . . stage drive unit (second drive unit), 21 . . . objective lens, 30 . . . interface detector, 30A . . . focusing optical system, 31 . . . first light source (light source), 32 . . . offset lens (lens), 34 . . . lens drive unit, 35 . . . optoelectronic converter, 36 . . . unit drive unit (first drive unit), 60 . . . image capture unit, 61 . . . signal processing unit, 71 . . . controller, 71a . . . first controller, 71b . . . second controller, 71c . . . image capture controller, 71d . . . first search unit, 71e . . . second search unit, 72 . . . input unit, OS . . . offset value (predetermined distance), A . . . image-formed position, F . . . focal position, O1 . . . first optical axis, O2 . . . second optical axis

The invention claimed is:

1. A microscope comprising:
a first optical system that collects a first light at a predetermined position in an observation object;
a second optical system that collects a second light at a predetermined position in a container containing the observation object;
a detector that detects a light from the container;
a controller; and
an image capture unit, wherein,
while moving a stage for holding the observation object in a direction perpendicular to an optical axis of an objective lens, the controller performs focus maintenance control for maintaining a focal position of the first light in a position distant by a first distance from the predetermined position in the container by moving at least one of the stage and the objective lens in a direction of the optical axis of the objective lens on the basis of the light detected by the detector, and
the controller moves the focal position of the first light to a plurality of positions by moving at least one of the stage and the objective lens in the direction of the optical axis of the objective lens, acquires a plurality of images by causing the image capture unit to capture images of the observation object, and causes the image capture unit to capture an image of the observation object at a position distant by a second distance from the predetermined position in the container by moving at least one of the stage and the objective lens in the direction of the optical axis of the objective lens on the basis of the images.

2. The microscope according to claim 1, wherein the controller detects a most appropriate capturing position for the observation object and causes the image capture unit to capture the image of the observation object at the most appropriate capturing position distant by the second distance from the predetermined position in the container by moving at least one of the stage and the objective lens in the direction of the optical axis of the objective lens on the basis of the images.

3. The microscope according to claim 1, wherein the controller temporarily stops the focus maintenance control, moves the focal position of the first light to the positions by moving at least one of the stage and the objective lens in the direction of the optical axis of the objective lens, and acquires the images by causing the image capture unit to capture images of the observation object.

4. The microscope according to claim 1, wherein the second optical system includes an offset optical system, and
while performing the focus maintenance control, the controller moves the focal position of the first light to the positions by moving at least part of the offset optical system in the direction of the optical axis of the objective lens, and acquires the images by causing the image capture unit to capture images of the observation object.

5. The microscope according to claim 1, wherein the controller causes the image capture unit to capture the image of the observation object at the position distant by the second distance from the predetermined position in the container by moving at least one of the stage and the objective lens in the direction of the optical axis of the objective lens on the basis of the contrast of the images.

6. A microscope comprising:
a first optical system that collects a first light at a predetermined position in an observation object;
a second optical system that collects a second light at a predetermined position in a container containing the observation object;
a detector that detects a light from the container;
a controller; and
an image capture unit, wherein,
while waiting for elapsing of a predetermined time interval in a method of capturing an image of the observation object at the predetermined time interval, the controller performs focus maintenance control for maintaining a focal position of the first light in a position distant by a first distance from the predetermined position in the container by moving at least one of the stage and the objective lens in a direction of the optical axis of the objective lens on the basis of the light detected by the detector, and
after the predetermined time interval is elapsed, the controller moves the focal position of the first light to a plurality of positions by moving at least one of the stage and the objective lens in the direction of the optical axis of the objective lens, acquires a plurality of images by causing the image capture unit to capture images of the observation object, and causes the image capture unit to capture an image of the observation object at a position distant by a second distance from the predetermined position in the container by moving at least one of the stage and the objective lens in the direction of the optical axis of the objective lens on the basis of the images.

7. The microscope according to claim 6, wherein the controller detects a most appropriate capturing position for the observation object and causes the image capture unit to capture the image of the observation object at the most appropriate capturing position distant by the second distance from the predetermined position in the container by moving at least one of the stage and the objective lens in the direction of the optical axis of the objective lens on the basis of the images.

8. The microscope according to claim 6, wherein the controller temporarily stops the focus maintenance control, moves the focal position of the first light to the positions by moving at least one of the stage and the objective lens in the direction of the optical axis of the objective lens, and acquires the images by causing the image capture unit to capture images of the observation object.

9. The microscope according to claim 6, wherein the second optical system includes an offset optical system, and
while performing the focus maintenance control, the controller moves the focal position of the first light to the positions by moving at least part of the offset optical system in the direction of the optical axis of the objective lens, and acquires the images by causing the image capture unit to capture images of the observation object.

10. The microscope according to claim 6, wherein the controller causes the image capture unit to capture the image of the observation object at the position distant by the second distance from the predetermined position in the container by moving at least one of the stage and the objective lens in the direction of the optical axis of the objective lens on the basis of the contrast of the images.

* * * * *